United States Patent [19]

Takagi

[11] Patent Number: 5,448,167
[45] Date of Patent: Sep. 5, 1995

[54] POWER SYSTEM CONTROL APPARATUS FOR REDUCING POWER FLUCTUATIONS

[75] Inventor: Yasuo Takagi, Kawasaki, Japan

[73] Assignee: Kabushiki Kaisha Toshiba, Kawasaki, Japan

[21] Appl. No.: 175,722

[22] Filed: Dec. 30, 1993

Related U.S. Application Data

[62] Division of Ser. No. 696,933, May 8, 1991, Pat. No. 5,300,876.

[30] Foreign Application Priority Data

May 11, 1990 [JP] Japan .................................. 2-120032

[51] Int. Cl.⁶ .......................... G01P 3/42; H02P 9/10
[52] U.S. Cl. ........................... 324/177; 322/58; 322/29; 322/32
[58] Field of Search ............... 324/163, 177, 207.12; 318/490, 650; 73/505, 511; 361/20, 21; 322/17-25, 28-32, 95-97, 58; 307/102, 105

[56] References Cited

U.S. PATENT DOCUMENTS 4,701,689 10/1987 Yuan et al. ............................ 322/58

FOREIGN PATENT DOCUMENTS 3834017  4/1990 Germany ............................ 324/177
463906  3/1975 U.S.S.R. ............................ 324/177
675367 11/1976 U.S.S.R. ............................ 324/177

*Primary Examiner*—Sandra L. O'Shea
*Assistant Examiner*—Jay M. Patidar
*Attorney, Agent, or Firm*—Oblon, Spivak, McClelland, Maier & Neustadt

[57] ABSTRACT

An improved power system control apparatus which reduces power fluctuations and includes an estimated unit for estimating the system impedance and phase difference angle using the generator power transmission terminal voltage, the reactive power and effective power of the system. The invention enables accurate power system impedance estimates in a real-time manner. The invention can be applied to a filter device for removing noise components from an angular velocity signal. The filter device comprises first arithmetic means for calculating changes in phase angle, second arithmetic means for calculating changes in angular velocity, a first integrating for integrating the changes in the phase angle to obtain an estimated phase angle, a second integrator for integrated the changes in angular velocity to obtain an estimated angular velocity and a power stabilizing filter for filtering the estimated angular velocity signal.

2 Claims, 17 Drawing Sheets

Xe=0.6

Xe=0.8

Xe=1.0

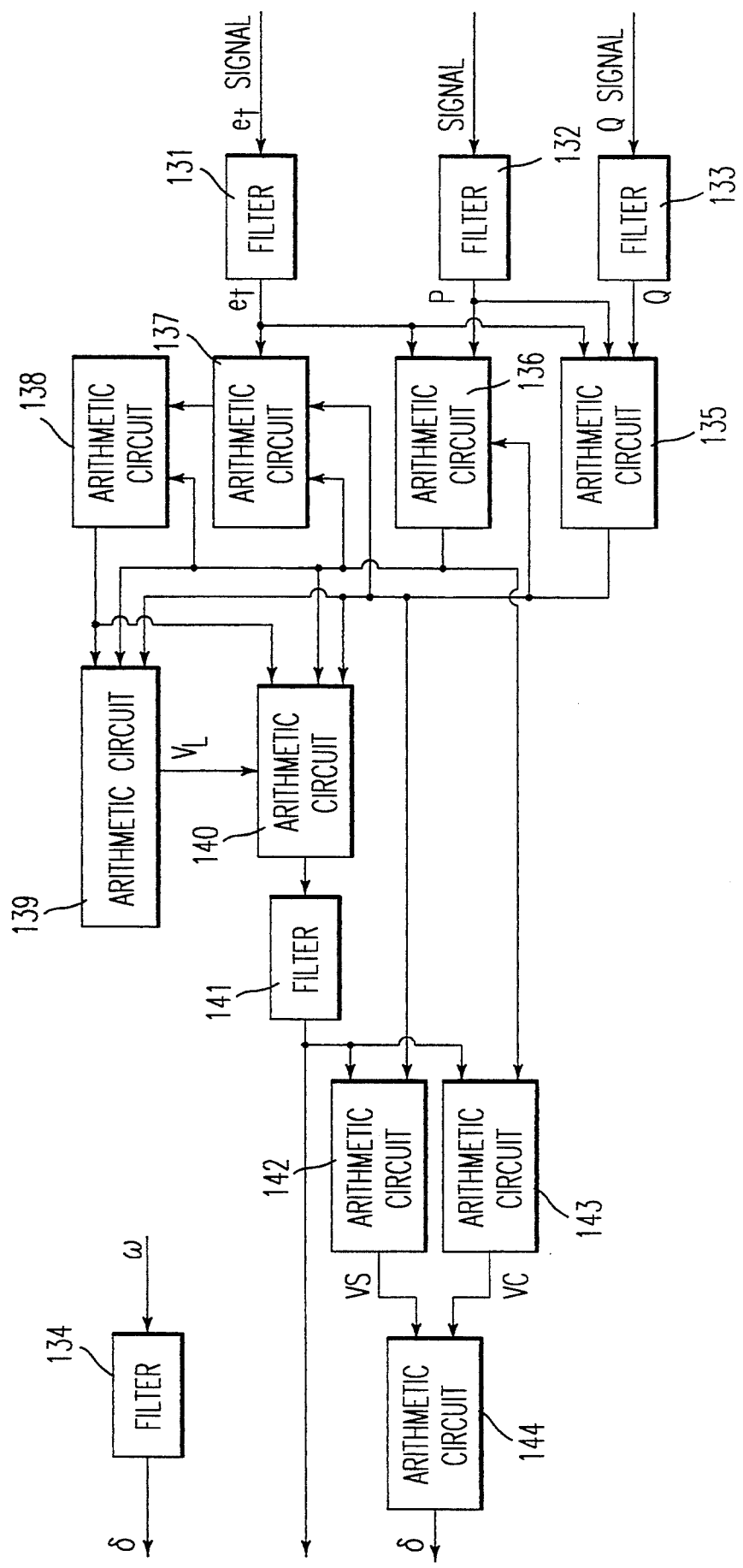

POWER SYSTEM CONTROL APPARATUS FOR REDUCING POWER FLUCTUATIONS

This is a division of application Ser. No. 07/696,933, filed on May 8, 1991, now U.S. Pat. No. 5,300,876.

BACKGROUND OF THE INVENTION

1. Field of the Invention

The present invention relates to a power system control apparatus for controlling a power system and, more particularly, to a power system control apparatus having an auto voltage regulator (to be referred to as an AVR hereinafter) and a power system stabilizer (to be referred to as a PSS hereinafter) connected to the AVR.

When the state of a power system is changed due to a variation in load, connection/disconnection of the system, or the like, the generator terminal voltage is changed which thereby causes a power fluctuation.

In this case, an AVR for controlling the excitation voltage is used as a power system control apparatus for stabilizing the generator terminal voltage. With only the AVR, however, the power fluctuation caused by the variation in load cannot be sufficiently suppressed.

For this reason, a PSS has been put into practical use together with the AVR since the late 1960s to stabilize the power system. The PSS is a unit for increasing an effect for suppressing the power fluctuation by excitation control of a power generator.

It is a known fact that stability of a power system is greatly changed by a power system impedance and a phase difference angle between a generator terminal voltage and an infinite bus voltage. In order to maintain the power system stable under any operating condition, it is preferable to change control gains of the AVR and the PSS in accordance with a state of the power system, particularly the power system impedance and the phase difference angle. Conventionally, in order to change the control gain, the power system impedance is estimated, thereby adjusting the control gain of the PSS.

For example, in a model of a power system (single-generator-coupled infinite bus system) 5 as shown in FIG. 1, in which an infinite bus 1 is coupled to a single generator 3 via a power system impedance, the amplitude and phase of its voltage $e_b$ are constant. An effective (active) power Pe and a reactive power Q can be expressed as follows:

$$Pe = (eq + Xq \cdot id)|et| \cdot \sin\delta / (Xe + Xq) \quad (1)$$

$$Q = (eq + Xq \cdot id)id - Xq \cdot i^2 \quad (2)$$

where eq: internal quadrature-axis reactance voltage
id: load current of direct axis
Xe: power system impedance
Xq: quadrature-axis synchronous reactance
$\delta$: phase difference angle
i: load current Note that the generator terminal voltage $e_t$ can be expressed by the following equation and assume that Xq=0.

$$et^2 = eq^2 + ed^2 \quad (3)$$

The active power Pe and the reactive voltage Q can be transformed as follows:

$$Pe = et \cdot eb / Xe \cdot \sin\delta \quad (4)$$

$$Q = et^2 / Xe - et \cdot eb / Xe \cdot \cos\delta \quad (5)$$

where $e_d$ is the internal synchronous reactance voltage (=Xq.id).

When the voltage $e_b$ of the infinite bus which is difficult to measure is cancelled from equations (4) and (5), the phase difference angle $\delta$ can be obtained from the following equation including amounts (the generator terminal voltage $e_t$, the active power Pe, and the reactive voltage Q) that can be easily measured and Xe:

$$\delta = \arctan\{Pe/(et^2/Xe - Q)\} \quad (6)$$

Conventionally, when several presumed Xe values are to be obtained, the corresponding active power Pe, reactive power Q, and generator terminal voltage $e_t$ are substituted in equation (6) to obtain phase difference angles $\delta_1, \delta_2, \ldots,$ and $\delta_n$.

These calculated different phase difference angles $\delta$ are compared with corresponding internal phase difference angles $\delta_{gen}$ measured at the generator terminal. An Xe value that yields a phase difference angle $\delta_i$ providing the minimum change over time is determined as the power system impedance at this time.

A conventional unit for estimating the power system impedance Xe comprises parameter measuring devices 9a to 9d, phase difference angle arithmetic units 11a to 11c, difference circuits 13a to 13c, correlation arithmetic units 15a to 15c, and a comparator 17, as shown in FIG. 2. According to the conventional impedance estimating unit, the comparison between a phase difference angle $\delta_i (1 \leq i \leq n)$ and an internal phase difference angle $\delta_{gen}$ is performed by obtaining their correlation. An Xe value that yields the maximum correlation is estimated as the power system impedance Xe.

With this conventional method, the phase difference angle $\delta$ is obtained by equation (6) to estimate the power system impedance Xe under an assumption that Xq=0. In practice, however, the quadrature-axis synchronous reactance Xq is as large as 1.5 pu (per unit) whereas the power system impedance Xe is as small as about 0.4 pu. Hence, equation (6) includes a significant error.

In the conventional method, the power system impedance Xe is estimated by obtaining the correlation between change in phase difference angle $\delta$, calculated in accordance with the above equation, and that in internal phase difference angle $\delta_{gen}$. Hence, the estimated power system impedance Xe includes a significant error.

Furthermore, when several different power system impedances Xe are to be estimated in a real time manner, a plurality of phase difference angles $\delta$ are calculated by equation (6), and the correlation between the phase difference angle $\delta$ and the internal phase difference angle $\delta_{gen}$ is obtained. Therefore, a large amount of calculation is needed, and many power system impedances Xe cannot be estimated from equation (6) in a real time manner. For this reason, in practice, about three different power system impedances Xe are estimated. As a result, the estimated power system impedance Xe is not so very accurate.

Since the correlation between the phase difference angle $\delta$ and the internal phase difference angle $\delta_{gen}$ is obtained as a function of time, the power system impedance Xe can only be estimated when a certain period of time elapses after the correlation is obtained. As a result, it is impossible to instantaneously estimate an abrupt change in power system impedance Xe to suppress fluctuation in the power system upon system disconnection and the like.

The power system stabilizer PSS for suppressing the fluctuation of the system is to be described with reference to FIG. 3.

FIG. 3 shows a typical example of a conventional power system control apparatus 19. The power system control apparatus 19 comprises an AVR 21 and a PSS 23. Excitation is performed only by a thyristor.

The basic operation of the AVR 21 is to control the excitation voltage by using the thyristor such that a difference between a terminal voltage $e_t$, measured by passing through a noise eliminating filter 25, and a target voltage value $e_{tref}$ is reduced. An actual AVR 21 also includes a damping circuit and the like. FIG. 3, the damping circuit is indicated as a gain/leading-delaying circuit 27.

At this time, the PSS 23 corrects the target voltage value $e_{tref}$ to indirectly control the excitation voltage.

As shown in FIG. 3, the PSS 23 generally has a reset circuit 29, a phase compensating circuit 31, a limiter 33a, and a noise eliminating filter 25b. FIG. 4 shows the response of the active voltage Pe when the target voltage value $e_{tref}$ is changed in a stepwise manner to control the cross-compound type thermal power generator having a rated power of 600 MW by using the PSS 23.

As is apparent from FIG. 4, when only the AVR 21 is used, fluctuations of 12.6 MW and 7.1 MW, at the first and second peaks, respectively, are excited. In contrast to this, when the PSS 23 is coupled to the AVR 21, the fluctuation of 7.4 MW at the first peak is converged.

In this manner, the PSS 23 has a good performance for suppressing a fluctuation in power system near the rated point.

The PSS 23 is a linear control circuit, as described above. In contrast to this, however, the power system does not have linear characteristics at all. These characteristics will be explained by way of the infinite bus system 5 coupled to a single generator as shown in FIG. 1.

In the infinite bus system 5 shown in FIG. 1, the dynamic characteristic of the phase difference angle $\delta$ that governs the power and voltage at the generator terminal is expressed by the following equation:

$$\frac{M}{\omega_0}\ddot{\delta} + \frac{D}{\omega_0}\dot{\delta} = Tm - Te \quad (7)$$

where
M: unit inertia constant×2
$\omega_0$: alternate frequency
Tm: mechanical torque
Te: electrical torque
D: intrinsic braking torque coefficient (braking coefficient)

The braking characteristic based on the phase difference angle $\delta$ is determined by the intrinsic braking torque coefficient D. When the coefficient D is large, the phase difference angle $\delta$ becomes stable against the disturbance, whereas when it is small, the angle $\delta$ fluctuates. When the angle $\delta$ fluctuates, the active power Pe fluctuates accordingly. The intrinsic braking torque coefficient D largely depends on the power system impedance Xe and the phase difference angle $\delta$.

$$D = eb^2 \cdot \omega_0 \left[ \frac{(Xd' - Xd'')Tdo''}{(Xd' + Xe)^2} \sin^2\delta + \frac{(Xq - Xq')Tqo''}{(Xq + Xe)^2} \cos^2\delta \right] (pu) \quad (8)$$

where
$e_b$: infinite bus voltage
Xd': direct-axis transient reactance
Xd'': direct-axis initial transient reactance
Tdo'': open-circuit initial time constant
Xq: quadrature-axis synchronous reactance
Xq'': quadrature-axis initial transient reactance
Tqo'': short-circuit initial time constant FIG. 5 shows the characteristics of the braking coefficient D associated with the parameter (power system impedance) Xe and the phase difference angle $\delta$, both of which change during operation of the generator.

The larger the power system impedance Xe and the closer the phase difference angle $\delta$ to 90°, the smaller the braking coefficient D. Namely, the phase difference angle and the power system impedance of the single-generator-coupled infinite bus system 5 vary.

FIGS. 6A and 6B show the response state of the single-generator-coupled infinite bus system 5 when the power system impedance Xe is changed in a stepwise manner. When the power system impedance Xe is changed from 0.2 pu to 0.3 pu, both voltage and power are well controlled by the effect of the PSS 23. Namely, the fluctuations in voltage and power are suppressed within a short period of time.

When the power system impedance Xe is changed from 0.2 pu to 1.0 pu, the conventional PSS 23 does not have a sufficiently large braking force for that and it takes considerable time to suppress the fluctuation in power. This is because in the conventional PSS 23 the power system impedance Xe becomes large and the phase difference angle $\delta$ becomes 70° or more, and thus the braking coefficient D becomes small.

In this manner, in the conventional PSS 23, when the power system impedance is changed largely due to partial disconnection of the power system, or the like, the braking characteristic is degraded.

When the power system impedance is largely changed due to a fluctuation in load, the braking characteristic of the PSS against the fluctuation in power is degraded.

SUMMARY OF THE INVENTION

It is an object of the present invention to provide a power system control apparatus which can correctly estimate a power system impedance in a real time manner, and which can sufficiently suppress a fluctuation in power due to a large change in power system impedance by using the estimated impedance.

According to the present invention, a power system state estimating unit is also provided to obtain an estimated power system impedance and an estimated phase difference angle by using the power transmission terminal voltage, reactive power, and effective power of a generator. A phase difference angle estimating circuit is also provided to estimate a phase difference angle by using the power system impedance estimated by the power system impedance estimating circuit. Furthermore, a gain schedule circuit is provided to change the control parameter of a power stabilizing system by using one or both of the power system impedance estimated by the power system impedance estimating circuit and the phase difference angle estimated by the phase difference estimating circuit.

A correction signal arithmetic circuit and an output circuit constitute a power system stabilizer. The correction signal arithmetic circuit receives a phase difference angle change, a phase difference angle differential, and a power system impedance, and calculates the correction signal of the target voltage value for the auto voltage regulator. The output circuit outputs the calculated correction signal to the auto voltage regulator.

The correction signal arithmetic circuit for calculating the correction signal of the target voltage value comprises a non-linear arithmetic circuit, a leading-delaying filter, and a reset circuit. The non-linear arithmetic circuit performs non-linear arithmetic operation by using the power system impedance, the phase difference angle, and the phase difference angle differential. The leading-delaying filter receives the operation result obtained by the non-linear arithmetic circuit. The reset circuit receives a signal output from the leading-delaying filter and resets the correction signal of the target voltage value.

According to the present invention, the phase difference angle estimating circuit estimates the phase difference angle by using the estimated power system impedance.

According to the present invention, the gain schedule circuit changes the control parameter of the power system stabilizer by using one or both of the power system impedance estimated by the power system impedance estimating arithmetic circuit and the phase difference angle estimated by the phase difference angle estimating arithmetic circuit.

According to the present invention, upon reception of a power system impedance, a phase difference angle differential, and a phase difference angle, the correction signal arithmetic circuit calculates a correction signal of a target voltage value of the auto voltage regulator. The calculated correction signal is output to the auto voltage regulator through the output circuit.

According to the present invention, the result calculated by the non-linear circuit of the correction signal arithmetic circuit for calculating a correction signal of a target voltage value is input to the leading-delaying filter. The signal processed by the leading-delaying filter is input to the reset circuit. The reset circuit outputs a correction signal. The output correction signal is output through the output circuit.

According to the present invention, the power system state estimating unit estimates the system impedance and the phase difference angle by using the generator power transmission terminal voltage, the reactive power, and the effective power.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 13 is a circuit diagram of a power system control apparatus according to the second embodiment of the present invention;

DETAILED DESCRIPTION OF THE PREFERRED EMBODIMENTS

Figure 7:
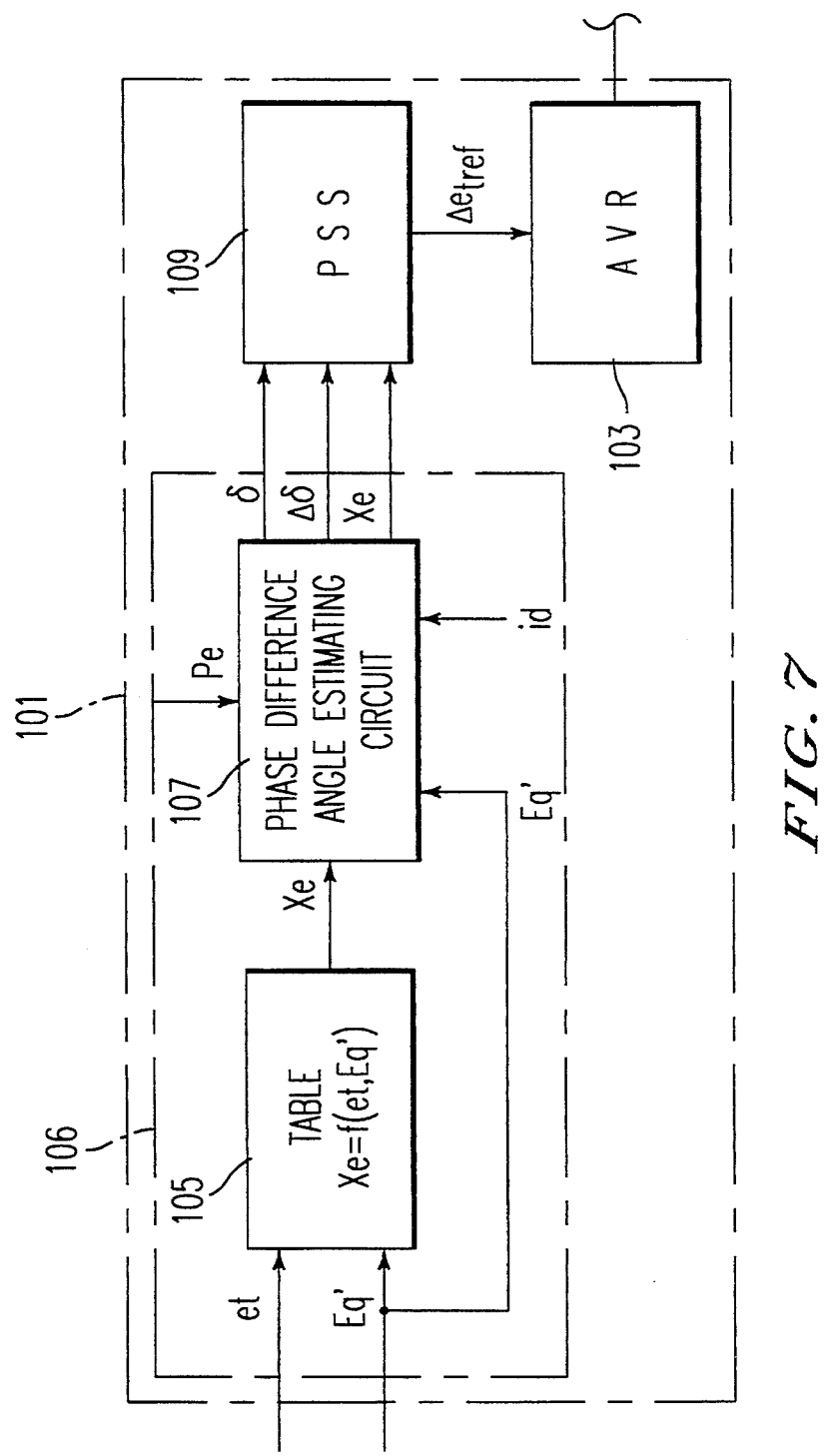
FIG. 7 is a block diagram showing a power system control apparatus according to the first embodiment of the present invention.
Figure 8A:
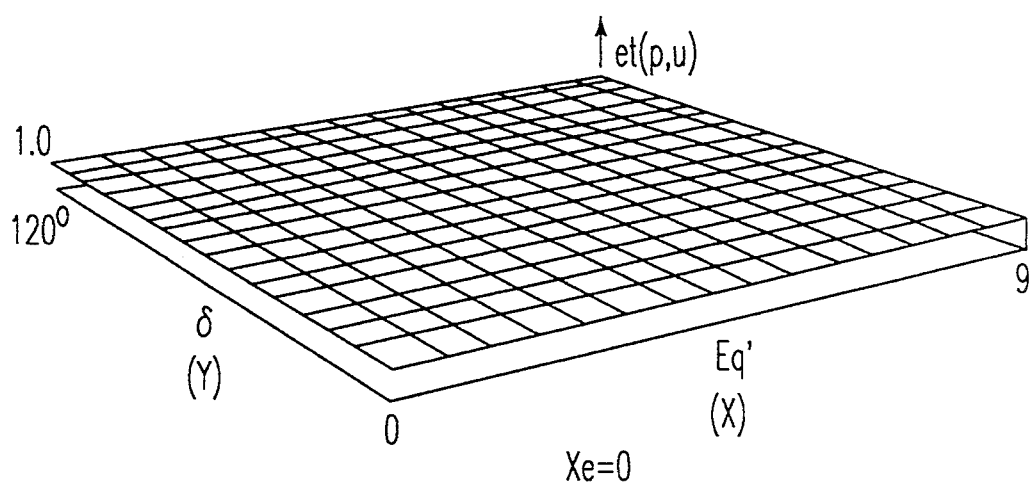
FIGS. 8A to 8F are graphs showing dependency of the generator terminal voltage on the phase difference angle, the internal voltage, and the power system impedance.
Figure 8B:
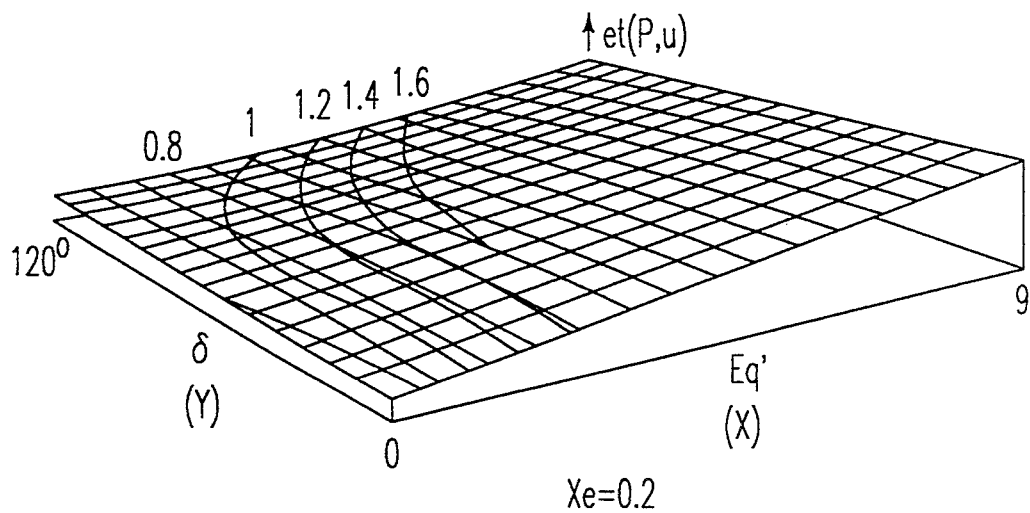
Figure 8C:
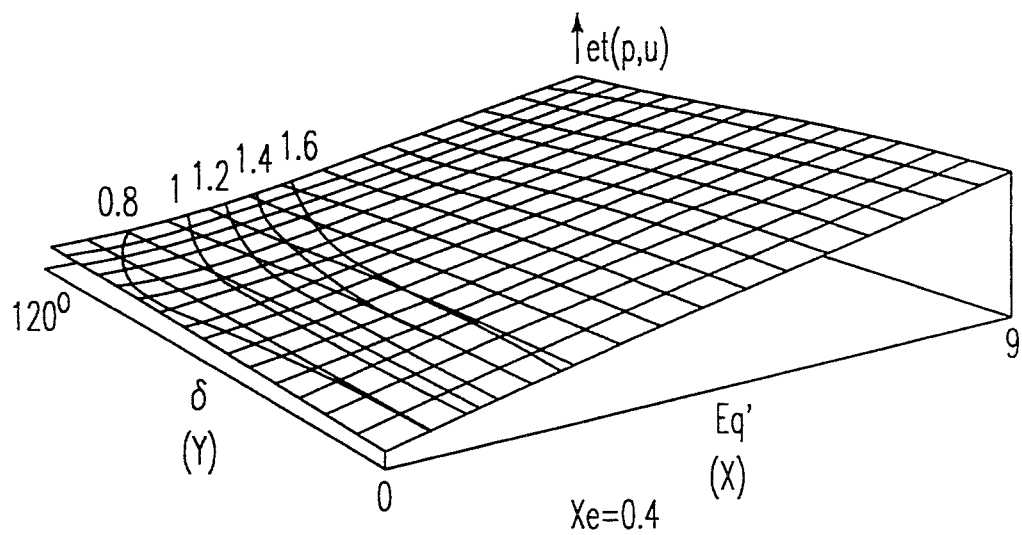
Figure 8D:
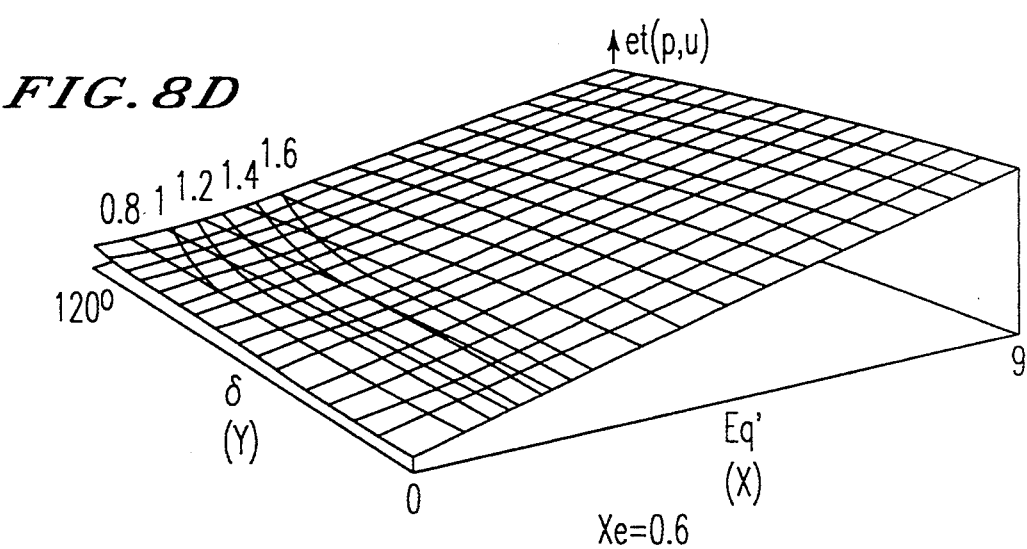
Figure 8E:
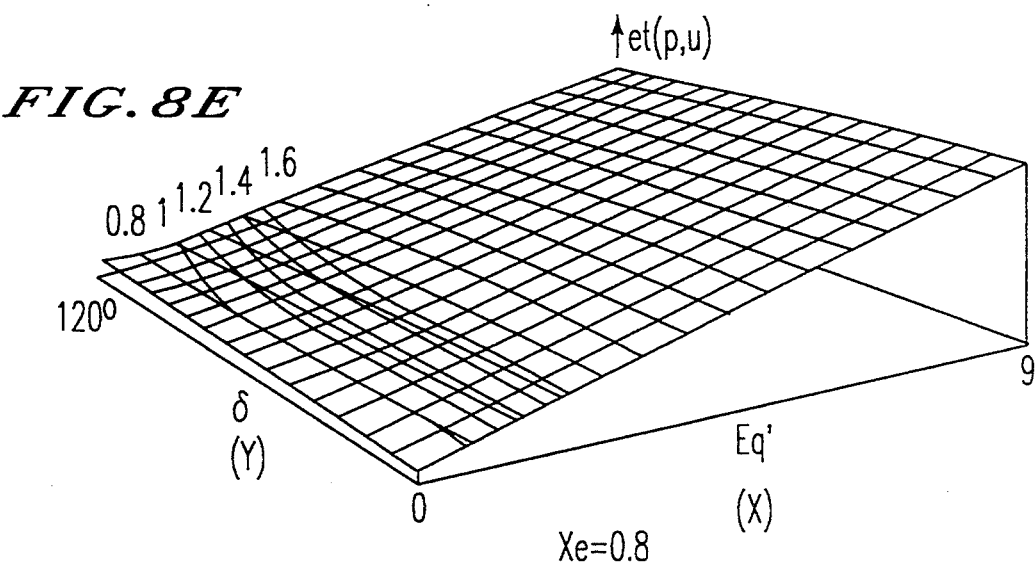
Figure 8F:
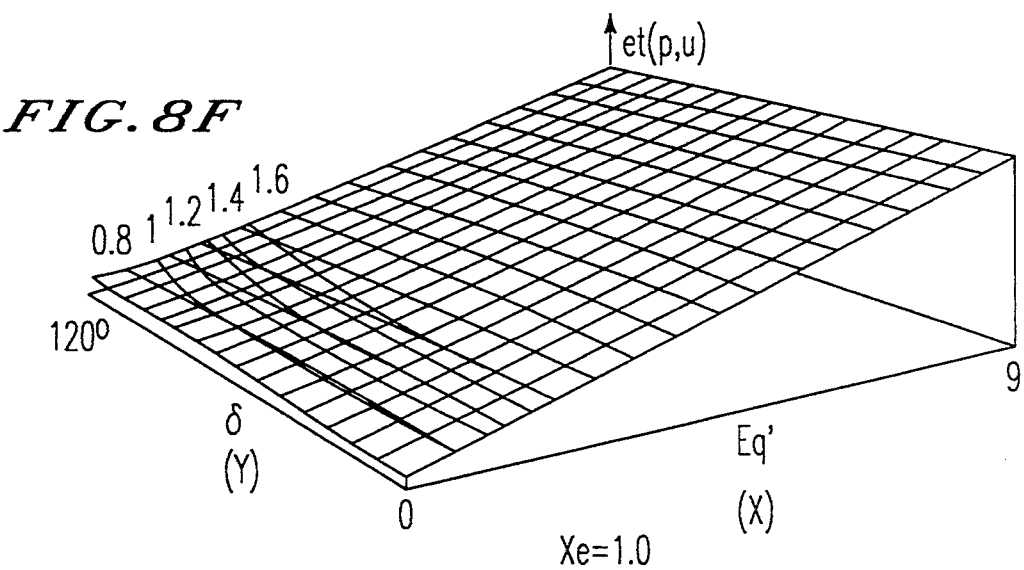

A power system control apparatus according to preferred embodiments of the present invention will be described with reference to FIGS. 7 to 12C. FIG. 7 is a block diagram showing the arrangement of a power system control apparatus 101.

As shown in FIG. 7, the power system control apparatus 101 comprises an auto voltage regulator (AVR) 103, a power system impedance estimating arithmetic unit 105, a phase difference angle estimating arithmetic unit 107, and a power system stabilizer (PSS) 109. The power system impedance estimating arithmetic unit 105 and the phase difference angle estimating arithmetic unit 107 constitute a power system condition estimating unit 106.

Figure 1:
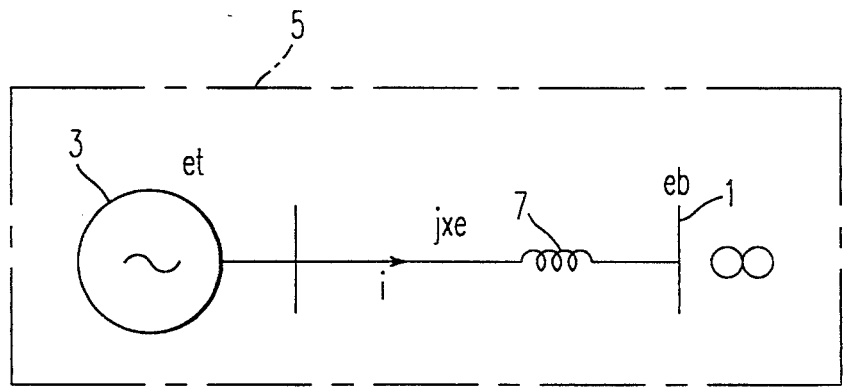
FIG. 1 shows the arrangement of a single-generator-coupled infinite bus system.
Figure 4:
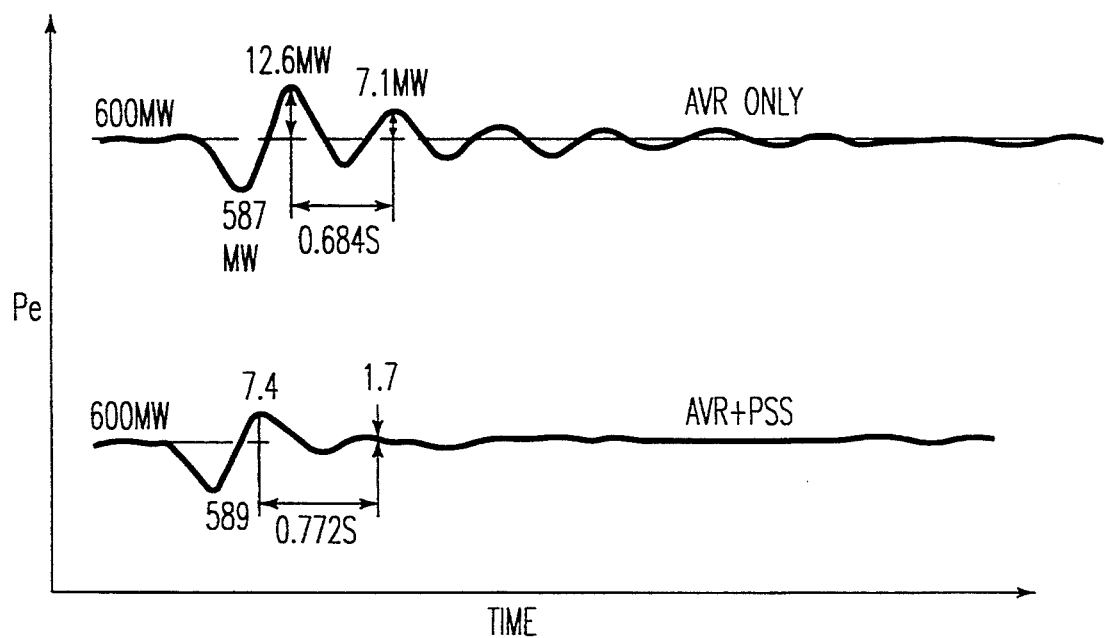
FIG. 4 is a graph showing the transient response of a power transmission active power when a target generator terminal voltage is changed in a stepwise manner by a conventional power system control apparatus.
Figure 2:
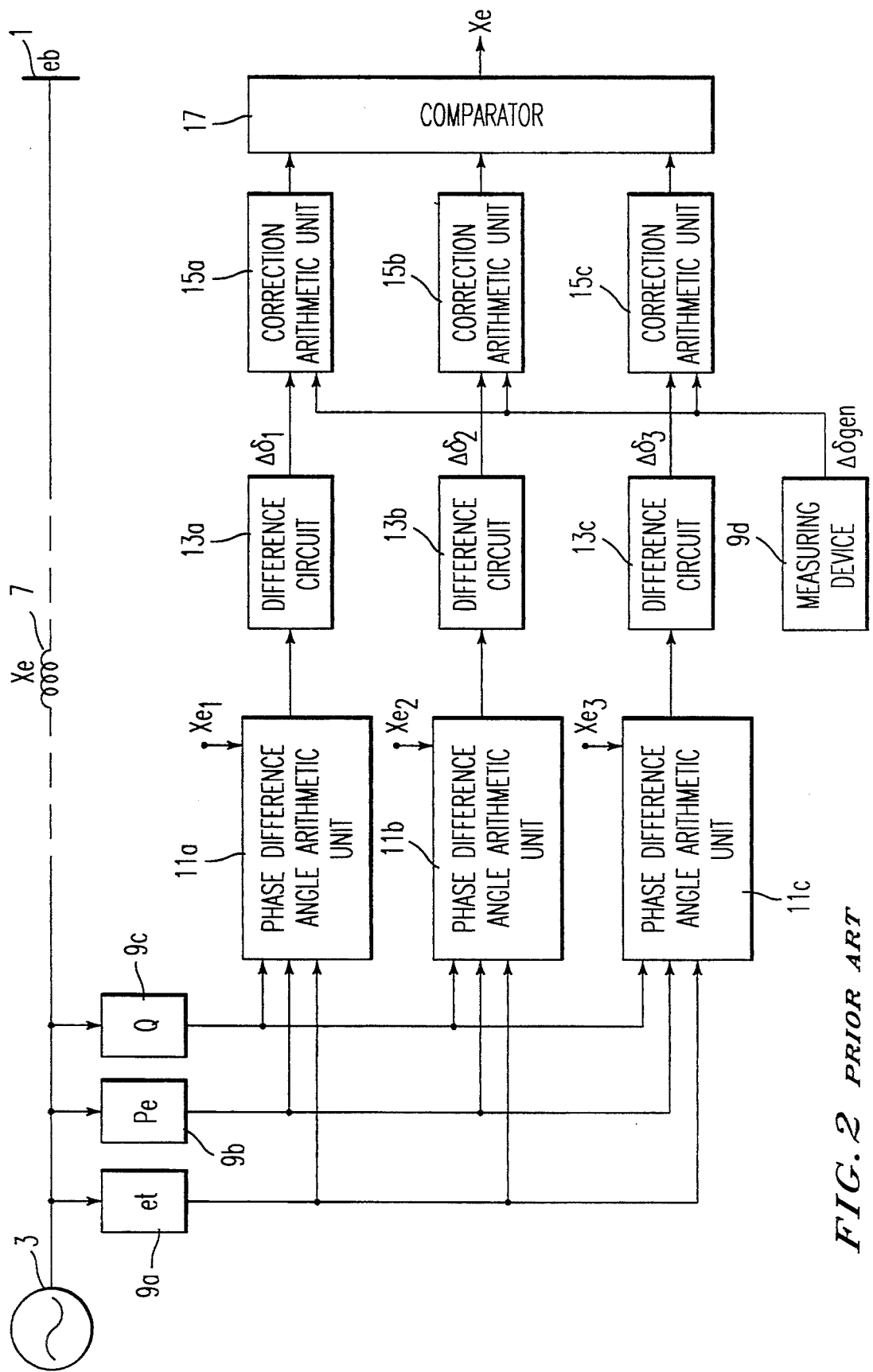
FIG. 2 is a block diagram showing the arrangement of a conventional auto voltage regulator.
Figure 3:
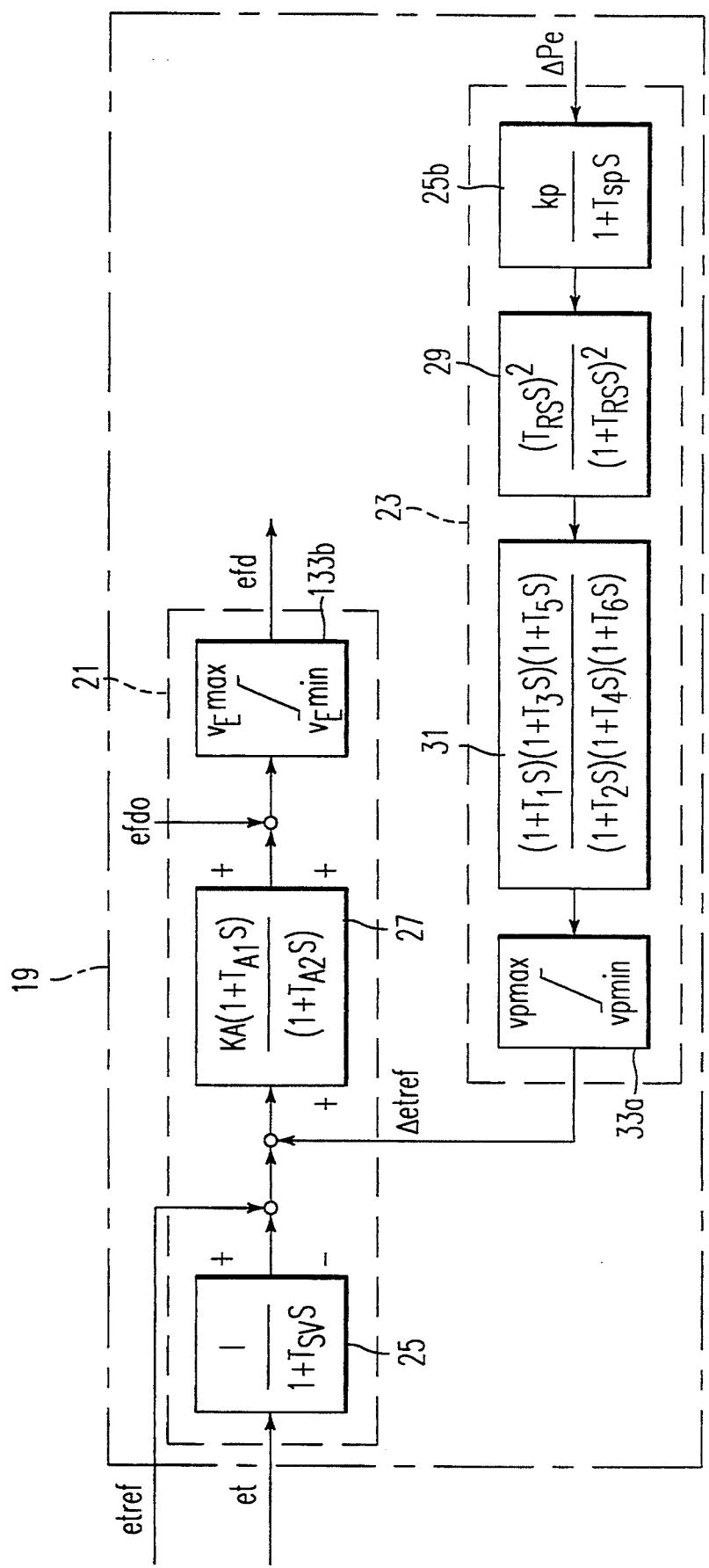
FIG. 3 is a block diagram showing the arrangement of a conventional power system stabilizer (PSS)
Figure 5:
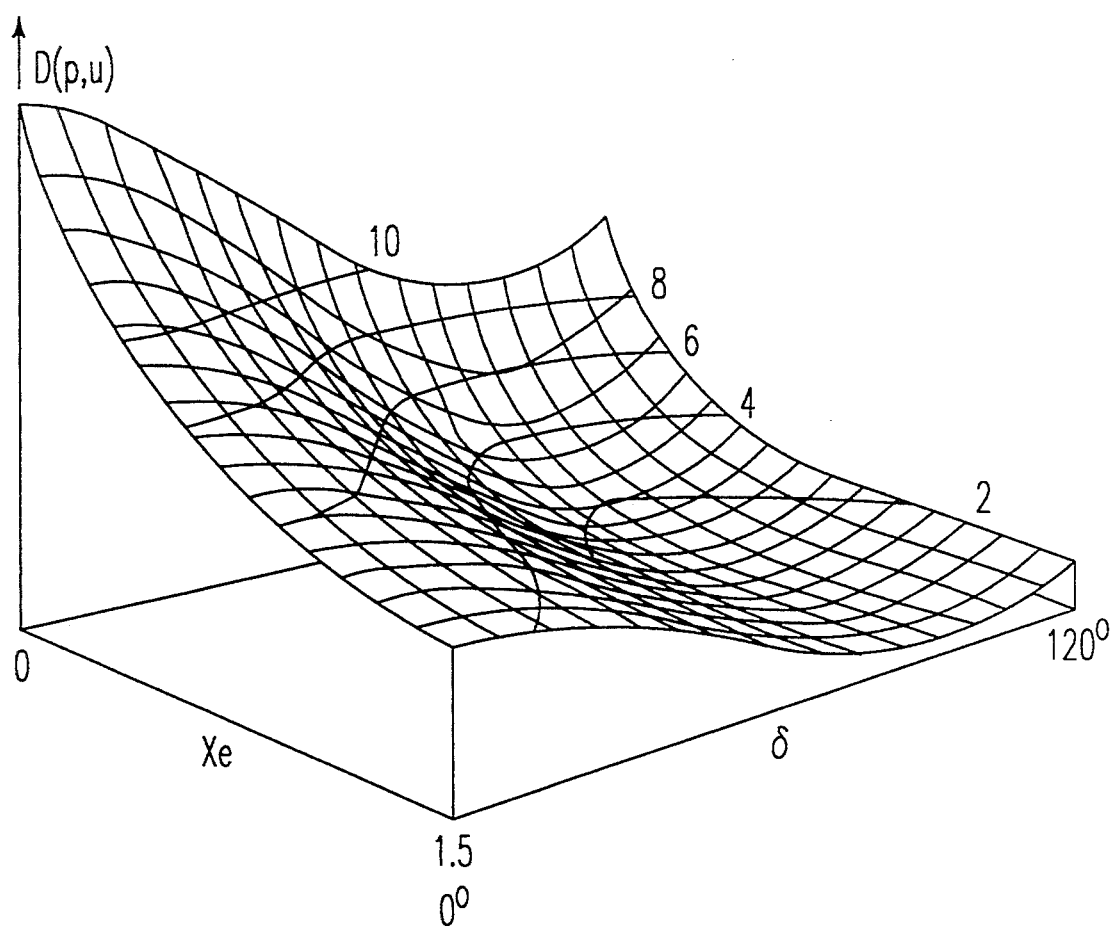
FIG. 5 is a graph of an intrinsic braking coefficient of a generator.

The AVR 103 has the same arrangement as the AVR 21 shown in FIG. 3 and the detailed description thereof is thus omitted. The other constituent components will be described below.

POWER SYSTEM IMPEDANCE ESTIMATING ARITHMETIC UNIT 105

Figure 9:
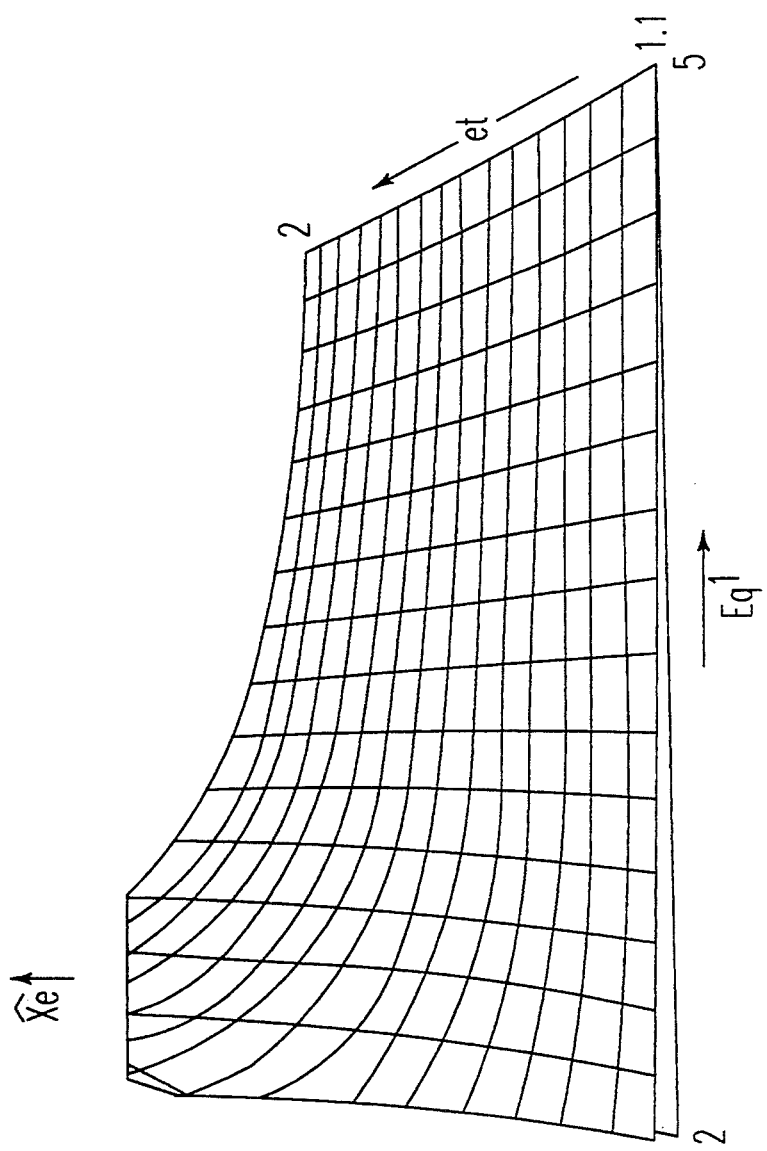
FIG. 9 is a graph showing an example of an operational table of a power system impedance estimating arithmetic unit.

The power system impedance estimating arithmetic unit 105 receives a generator terminal voltage $e_t$ and a generator internal voltage $Eq'$ to estimate a power system impedance Xe. More specifically, a table ($e_t$, $Eq'$-Xe) shown in FIG. 9 is set in the impedance estimating arithmetic unit 105. The impedance estimating arithmetic unit 105 receives a generator terminal voltage $e_t$ and a quadrature-axis internal voltage $Eq'$ and outputs a power system impedance Xe. The operating principle of the power system impedance estimating arithmetic unit 105 will be described below. First, a generator terminal voltage $e_t$ is expressed by the following formula:

$$|et| = \sqrt{\left(Eq' - \frac{Xd'(Eq' - |et|\cos\delta)}{Xe + Xd'}\right)^2 + \left(\frac{Xq|et|\sin\delta}{Xe + Xq}\right)^2} \quad (9)$$

where
- Xd': direct-axis transient reactance
- et: generator terminal voltage
- Eq': generator internal voltage
- $e_b$: infinite bus voltage
- Xq: quadrature-axis synchronous reactance In this manner, the generator terminal voltage $e_t$ may appear very complicated from formula (9). However, when the constant direct-axis transient reactance Xd' and the quadrature-axis synchronous reactance Xq intrinsic to the generator are substituted into equation (9) and the infinite bus voltage $e_b$ is assumed as an appropriate value, e.g., 1 pu, as the voltage $e_b$ has a constant amplitude, the voltage $e_t$ can be approximated by a simple equation substantially independent of a phase difference angle $\delta$.

FIGS. 8A to 8F show in a three-dimensional manner the relationship among the phase difference angle $\delta$, the quadrature-axis internal voltage $Eq'$, and the generator terminal voltage $e_t$ for various power system impedances Xe, i.e., for Xe=0, 0.2, 0.4, 0.6, 0.8, and 1.0 when the direct-axis transient reactance Xd'=0.45 and the quadrature-axis synchronous reactance Xq=1.52. In the drawings, contour lines are drawn at portions corresponding to the generator terminal voltages $e_t$=0.8, 1.0, 1.2, 1.4, and 1.6.

In this embodiment, the generator terminal voltage $e_t$ does not substantially depend on the phase difference angle $\delta$. Therefore, the generator terminal voltage $e_t$ is a function of only two variables, i.e., an estimated generator internal voltage $Eq'$ that can be easily estimated and a power system impedance Xe to be obtained. In addition, as is apparent from FIGS. 8A to 8F, the generator terminal voltage $e_t$ and the generator internal voltage $Eq'$ change linearly.

As described above, the generator terminal voltage $e_t$ can be approximated by the simple function of the generator internal voltage $Eq'$ and the power system impedance Xe. Therefore, the power system impedance estimating arithmetic unit 105 can be easily realized by solving this function with respect to the power system impedance Xe. In other words, when the table of Xe=-f($e_t$, Eq), i.e., the table of FIG. 9 is formed, the impedance estimating arithmetic unit 105 can be realized.

PHASE DIFFERENCE ANGLE ESTIMATING ARITHMETIC UNIT 107

The phase difference angle estimating arithmetic unit 107 is connected to the output of the power system impedance arithmetic unit 105 and obtains the phase difference angle $\delta$ by using the power system impedance Xe. In this case, the infinite bus voltage $e_b$ is deleted from, e.g., equations (1) and (2) previously indicated to obtain the phase difference angle $\delta$. In other words, the phase difference angle estimating arithmetic unit 105 estimates the phase difference angle 8 based on the following equation:

$$\delta = \arctan\left(\frac{(Xe + Xq)Pe}{Eq^2 - Eq(Xe + Xq)id}\right) \quad (10)$$

In this method, an estimation error of the power system impedance Xe occurs because of the phase difference dependency on the generator terminal voltage $e_t$. However, as is apparent from FIGS. 8A to 8F, this error is small in a range of $0° \leq \delta \leq 80°$ which is a normal operation range. When the power system impedance is 0.2 or less, a rather large error may occur. However, when the ordinary power system impedance Xe is 0.2 or more, the error is sufficiently allowable.

In this manner, the power system impedance Xe and the phase difference angle $\delta$ to be obtained can be directly obtained from the generator internal voltage Eq', the generator terminal voltage $e_t$, the active power Pe, and the reactive power that can be easily measured, by using a simple equation. As a result, a state of the power system can be correctly estimated in a real time manner.

POWER SYSTEM STABILIZER (PSS) 109

Figure 10:
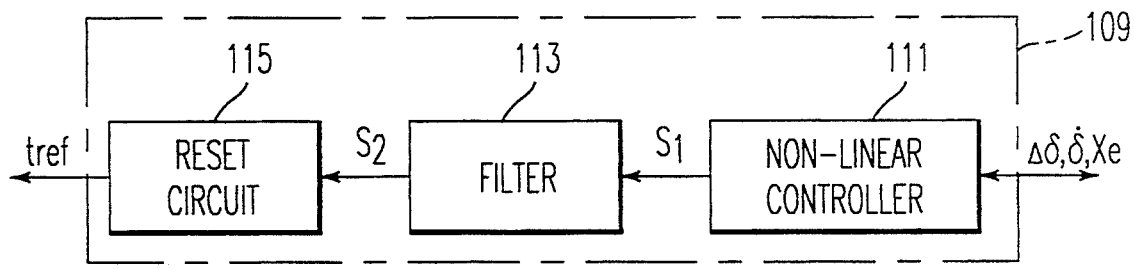
FIG. 10 is a block diagram showing a power system stabilizer (PSS)

The PSS 109 comprises a non-linear control unit 111, a leading-delaying filter 113, and a reset circuit 115, as shown in FIG. 10. The non-linear control unit 111 receives a phase difference angle change $\Delta\delta$, a phase difference angle differential $\dot{\delta}$, and the estimated power system impedance Xe to perform non-linear arithmetic operation.

Figure 11:
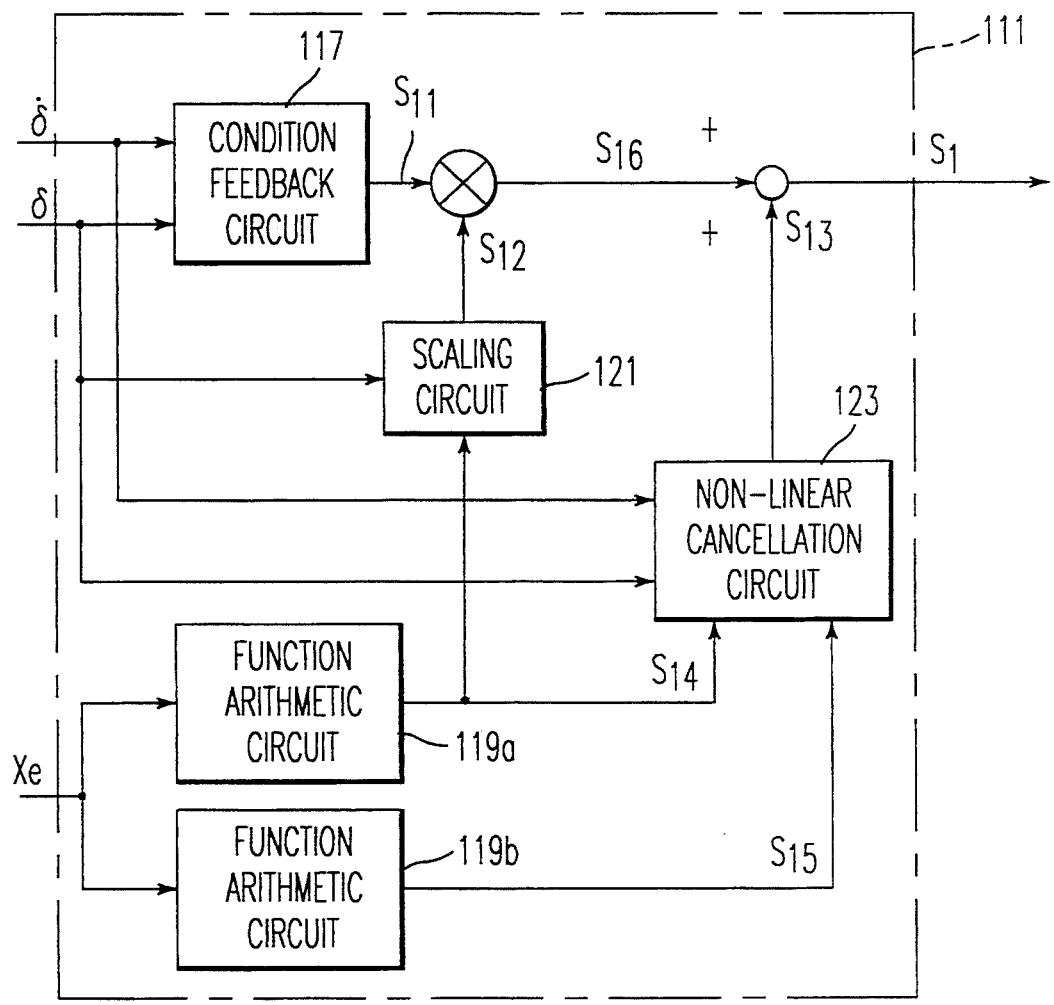
FIG. 11 is a block diagram showing the arrangement of a non-linear control unit.

The non-linear control unit 111 comprises a state feedback circuit 117, function arithmetic units 119a and 119b, a scaling circuit 121, and a non-linear canceling circuit 123, as shown in FIG. 11.

The non-linear control unit 111 receives the phase difference angle change $\Delta\delta$, the phase difference angle differential $\dot{\delta}$, and the power system impedance Xe to cancel and compensate for the non-linear component of the power system, thereby controlling a signal S11 as the internal variable of the PSS 109 such that the dynamic characteristics of the phase difference angle change $\Delta\delta$ and the phase difference angle differential $\dot{\delta}$ become appropriate linear systems. This control is performed in accordance with, e.g., state-space linearization. With this method, a system expressed by the following differential equation (11) is obtained:

$$\dot{x} = f(x) + g(x)u \quad (11)$$

where
ẋ: state variable
u: control amount
f, g: smooth functions depending on state variable In contrast to this, when the following conversion of the control amount $\underline{u}$ and the state variable $\underline{x}$ is performed, a linear system can be obtained for both a converted state $\underline{z}$ and a converted control amount $\underline{v}$.

$$u = \alpha(x) + \beta(x)v \tag{12}$$

$$\dot{z} = Ax + bv \tag{13}$$

$$\beta(x) = 1/L_g L_f^{n-1} \phi(x) \tag{14}$$

$$\alpha(x) = (-L_f^n \phi(x)) \cdot \beta(x) \tag{15}$$

where A and $\underline{b}$ are a constant matrix and a spectrum, respectively.

$$Z = \begin{bmatrix} \phi(x) \\ L_f \phi(x) \\ \cdot \\ \cdot \\ \cdot \\ L_f^{n-1}\phi(x) \end{bmatrix} \tag{17}$$

where $\phi$ is a smooth function satisfying the following relation:

$$L_g \phi(x) = L_g L_f \phi(x) = \ldots = L_g L_f^{n-2} \phi(x) \tag{17}$$

$$L_g L_f^{n-1} \phi(x0) \neq 0 \tag{18}$$

where x0 represents an initial state.

In accordance with this method, when equations (7) and (8) of the power system are applied to equation (11) by an appropriate approximation and then to operation amount conversion and state variable conversion, the calculation equation of the non-linear control unit 111 is obtained.

The signal S11 output from the non-linear control unit 111 corresponds to the control amount $\underline{v}$ of equation (12). The scaling circuit 121 calculates equation (14) and the non-linear canceling circuit 123 calculates equation (15).

The function arithmetic units 119a and 119b compensate for a change in the dynamic characteristic obtained by the power system impedance Xe. The state feedback unit 117 is a linear control unit.

The dynamic characteristic of v−(δ, δ̇) has a non-linear system expressed by (A, b) by the conversion described above. Therefore, it is easy to design the control program for this.

As a result, the phase difference angle δ and its differential δ̇ can be stably controlled independent of the operation state while a sufficient braking force is maintained. Namely, the generator terminal voltage $e_t$ and the active power Pe are stably controlled while there is maintained a sufficiently large braking force against a large change in operation state, e.g., in power system impedance.

The leading-delaying filter 113 compensates for a phase of an output signal S1 from the non-linear control unit 111 to improve the stability of the power system. When the power system is set in a steady state and the fluctuation in power converges, the reset circuit 115 sets the output from the PSS 109 to 0 so that the generator terminal voltage $e_t$ is converged to the target voltage value $e_{tref}$ by the AVR 103 without deviation.

The calculation performed by the arithmetic units described above will be described.

The state feedback unit 117 receives the phase difference angle change Δδ and an estimated value of the phase difference angle differential δ̇ to calculate the signal S11 in accordance with the following equation:

$$S11 = k_1 \times \Delta\delta + k_2 \times \delta \tag{19}$$

where $k_1$ and $k_2$ are constants.

The function arithmetic units 119a and 119b receive the power system impedance Xe to perform functional arithmetic operation to output signals S14 and S15, respectively.

The scaling circuit 121 receives the estimated value of the phase difference angle δ and the signal S14 and outputs a signal S12. The signals S11 and S12 are multiplied to obtain a signal S16. The non-linear canceling circuit 123 receives the phase difference angle δ, the estimated phase difference angle differential δ̇, and the signals S14 and S15 to obtain a signal S13.

The signals S13 and S16 are added to obtain the signal S1, which is an output from the non-linear control unit 111.

The calculation performed by the blocks of FIGS. 10 and 11 are described below.

Reset circuit 115:

$$\Delta e_{tref} = \{S/(1+S)\} S2 \tag{20}$$

Leading-delaying filter 113:

$$S2 = \{(1+k_4 S)/(i + k_3 S)\} S1 \tag{21}$$

Scaling circuit 121:

$$S12 = k_6/(S14 \cdot \delta(\delta - k_5)) \tag{22}$$

Non-linear canceling circuit 123:

$$S13 = (S15 \cdot \overset{\circ}{\delta}(k_6 - (\cos\delta)2))/(S14 \cdot \delta(\delta - k_7)) \tag{23}$$

Function arithmetic unit 119a:

$$S14 = k_{10}/(Xe k_8(k_9 Xe + 1) \tag{24}$$

Function arithmetic unit 119b:

$$S15 = k_{12}/(k_{11} + Xe)2 - k_{13} \tag{25}$$

Note that in equations (9) to (24) $k_1$ to $k_{13}$ are constants conforming to the reactance and the time constant of the power generator to be controlled.

Figure 12A:
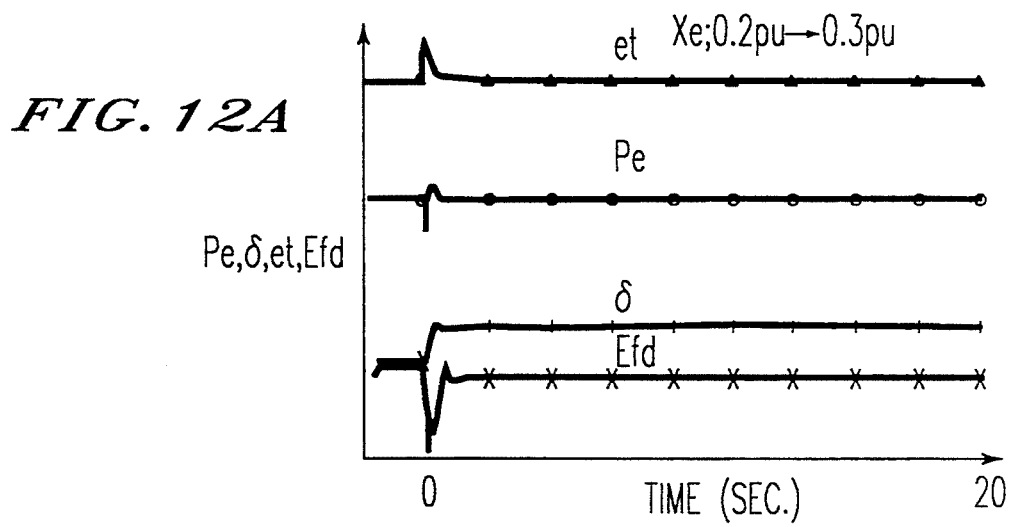
FIGS. 12A to 12C are graphs showing the response of the power system when the power system impedance is changed.
Figure 12B:
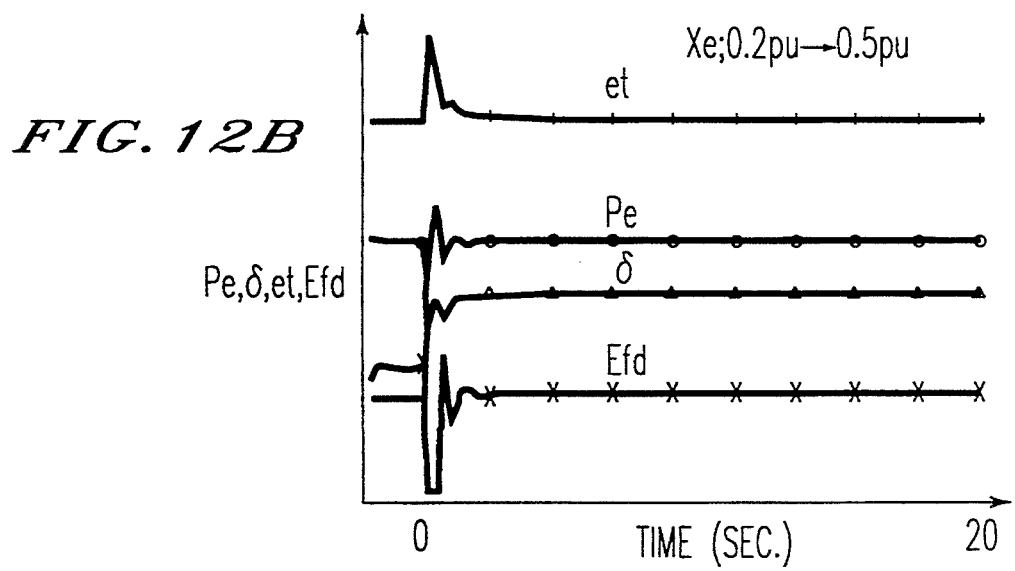
Figure 12C:
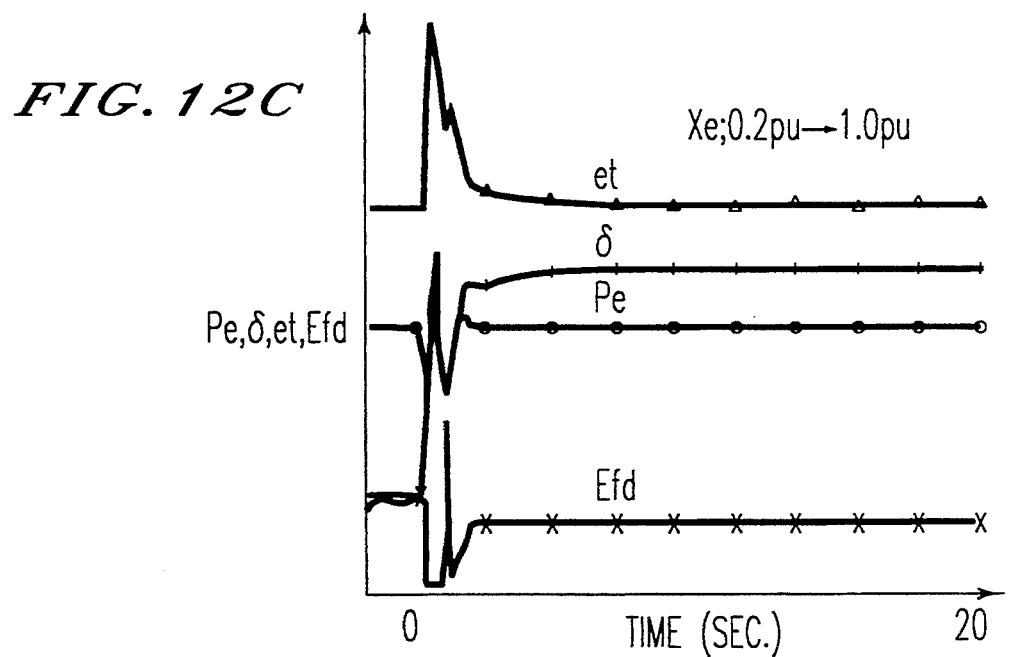

FIGS. 12A to 12C show the response of the PSS 109 of this embodiment when the power system impedance Xe is changed in three different ranges. FIG. 12A shows the response when the power system impedance Xe is changed from 0.2 pu to 0.3 pu, FIG. 12B shows the response when the power system impedance Xe is changed from 0.2 pu to 0.5 pu, and FIG. 12C shows the response when the power system impedance is changed from 0.2 pu to 1.0 pu.

Figure 6A:
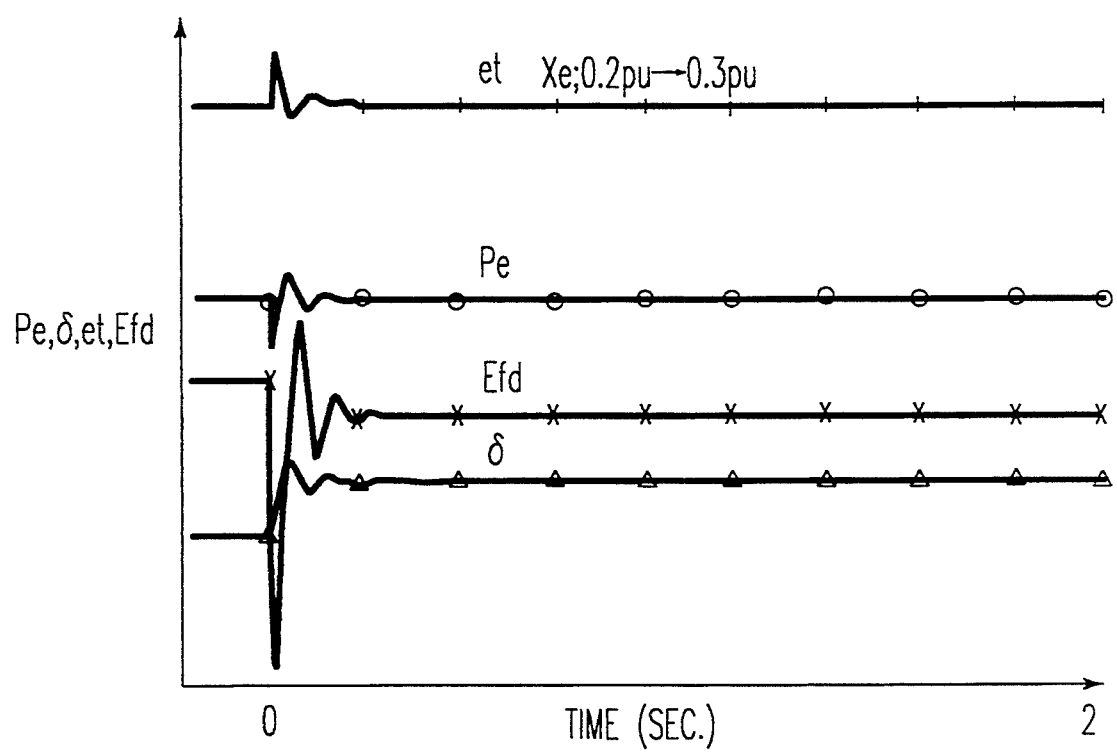
FIGS. 6A and 6B are graphs of power system response when the power system impedance of the conventional power system control apparatus is changed.
Figure 6B:
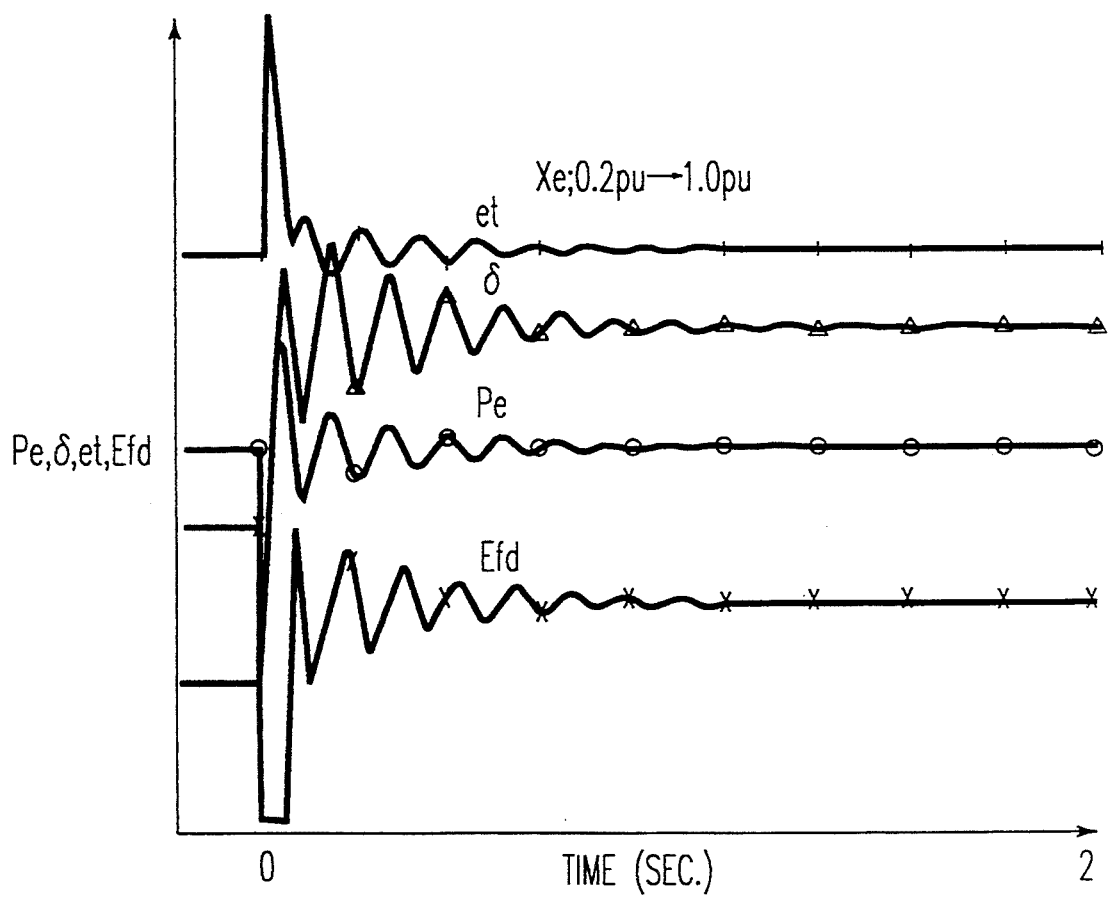

From these results, the fluctuation in any one of these cases attenuates for a shorter period of time than that of the conventional response shown in FIGS. 6A and 6B, and hence a sufficient braking force is ensured.

In this manner, according to this embodiment, the power system impedance Xe and the phase difference δ are obtained directly from the generator terminal voltage $e_t$, the active power Pe, and the reactive power Q that can be measured easily. Therefore, the state of the power system can be correctly estimated in a real time manner. The generator terminal voltage $e_t$ and the active power Pe of the power system can be stably controlled with a sufficient braking force being maintained even upon a large change in operation state, e.g., in power system impedance Xe.

In this embodiment, the phase difference angle δ is obtained from the power system impedance Xe in accordance with equation (10). However, the present invention is not limited to this, and the phase difference angle δ can be obtained in accordance with other equations.

In this embodiment, the phase difference angle change Δδ, the phase difference angle δ, and the power system impedance Xe are input to cancel and compensate for the non-linearity of the power system so that the dynamic characteristics of the phase difference angle change Δδ and the phase difference angle δ become appropriate linear systems by means of the signal S11 as the internal variable of the PSS in accordance with state-space linearization. However, the present invention is not limited to this and other methods can also be adopted.

Another embodiment of the present invention will be described with reference to FIG. 13.

Primary delaying filters 131 to 134 receive the generator terminal voltage signal $e_t$, the active power signal P, the reactive power signal Q, and the rotational number signal ω, respectively, and remove noise components therefrom. The output signal $e_t$ from the primary delaying filter 131 is input to arithmetic circuits 135 to 137, and the output signal P from the primary delaying filter 132 is input to the arithmetic circuits 135 and 136. The output signal Q from the primary delaying filter 133 is input to the arithmetic circuit 135.

The arithmetic circuits 135 and 136 calculate armature currents Iq and Id of the q-axis and d-axis, respectively, of the power generator in accordance with following equations (26) and (27):

$$Iq = \frac{Pe_t}{\sqrt{(P \times q)^2 + (e_t^2 + Q \times q)^2}} \quad (26)$$

$$Id = \frac{P - Iq\sqrt{e_t^2 - (xqIq)^2}}{xqIq} \quad (27)$$

The arithmetic circuit 137 and an arithmetic circuit 138 calculate the generator internal voltages Eq and Eq' in accordance with following equations (28) and (29):

$$Eq' = \sqrt{e_t^2 - (xqIq)^2} + xd'Id \quad (28)$$

$$Eq = Eq' + (xq - xd')Id \quad (29)$$

The output terminals of the arithmetic circuits 135, 136, and 138 are connected to the input terminals of arithmetic circuits 139 and 140. The arithmetic circuit 139 calculates VL in accordance with the following equation (30) and inputs VL to the arithmetic circuit 140. The arithmetic circuit 140 calculates an approximated value Xe' of the power system impedance in accordance with the following equation (31):

$$VL = (EqId)^2 - (Eq^2 - 1)(Iq^2 + Id^2) \quad (30)$$

$$Xe' = \frac{EqId - \sqrt{VL}}{Iq^2 + Id^2} - xq \quad (31)$$

The estimated power system impedance Xe is obtained from the approximated value Xe' of the power system impedance output from the arithmetic circuit 140 by the primary delaying filter 141. The value Xe' corresponds to $\hat{X}e$ shown in FIG. 14, but the estimated value $\hat{X}e$ is slightly delayed from the value Xe' due to the filter. The power system impedance changes in a substantially stepwise manner whereas the phase difference angle consecutively varies about every second. The primary delaying filter 141 utilizes the difference in response waveforms of the power system impedance and the phase difference angle and removes a change in phase difference angle included in the approximated value of the power system impedance.

When the power system impedance Xe obtained by a primary delaying filter 141 is input to arithmetic circuits 142 and 143, VS and VC are obtained in accordance with following equations (32) and (33):

$$VS = Iq(Xe + Xq) \quad (32)$$

$$VC = Eq - Id(Xe + Xq) \quad (33)$$

An arithmetic circuit 144 calculates the phase difference angle δ based on VS and VC obtained by the arithmetic circuits 142 and 143. Namely, the arithmetic circuits 142 to 144 constitute a non-linear arithmetic unit for calculating an estimated phase difference angle from the estimated power system impedance, the active power Pe, the reactive power Q, and the generator terminal voltage $e_t$.

Figure 14:
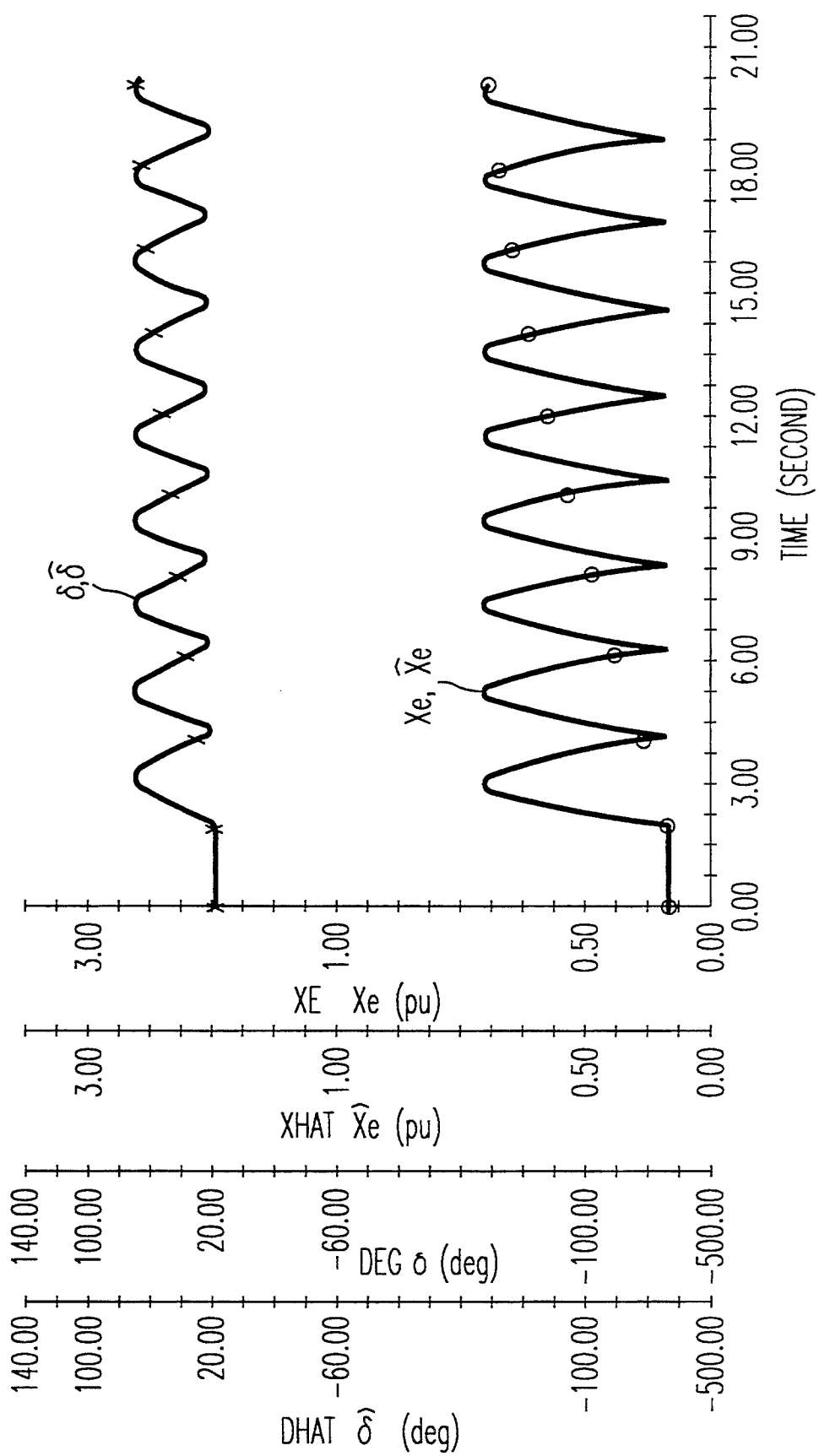
FIG. 14 is a graph showing power system impedances and phase difference angles estimated by the power system control apparatus shown in FIG. 13.

FIG. 14 shows the phase difference angle δ and the power system impedance Xe that are estimated in the embodiment shown in FIG. 13. Note that in the drawing Xe is changed in accordance with 0.2+0.9 |sin(t−2)| (where t is a time in units of seconds). It is thus obvious that the power system impedance can be estimated considerably accurately.

In this embodiment, the power system impedance and the phase difference angle can be estimated in a real time manner. Thus, the state of the power system can be obtained in a real time manner when a great change occurs in the power system due to partial disconnection of the system or the like, thereby estimating the stability of the power system in a real time manner. The control gains for the AVR and the PSS can be switched to optimize the power system from the estimated power system impedance and the estimated phase difference angle. As a result, when a great change occurs in the power system, the generator terminal voltage Pe that tends to be unstable conventionally can be controlled considerably stably.

Figure 15:
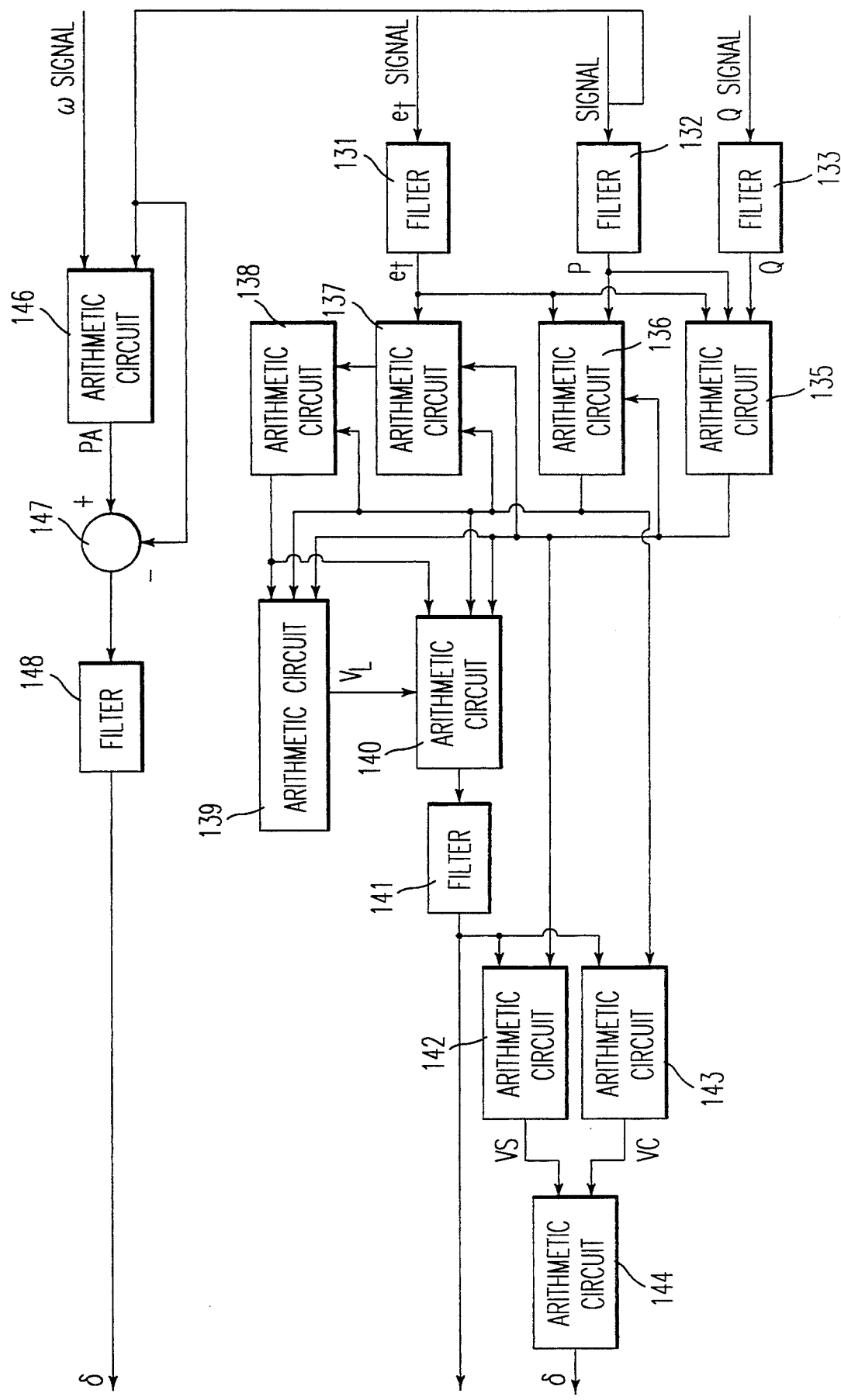
FIG. 15 is a circuit diagram of a power system control apparatus according to the third embodiment of the present invention.

Still another embodiment will be described with reference to FIG. 15.

This embodiment has substantially the same circuit configuration as that of the embodiment of FIG. 13. The same reference numerals are used to denote the same parts and a detailed description thereof is omitted.

In this embodiment, an arithmetic circuit 146 is provided to receive the rotational number signal ω and the active power signal Pe of the power generator. The arithmetic circuit 146 adds the rotational number signal ω and the active power signal Pe and filters the sum by a primary filter. An acceleration force Pv calculated by the arithmetic circuit 146 and the active power Pe are input to a subtracter 147, and a difference between the acceleration force Pv and the active power Pe is input to an integrator 148. The integrator 148 integrates the difference to output an integral of the phase difference angle δ. Namely, the arithmetic unit constituted by the arithmetic circuit 146, the subtracter 147, and the integrator 148 filters the sum of the active power signal and the rotational number signal of the power generator, calculates the mechanical power of the generator, and integrates the difference between the mechanical power and the active power, thereby estimating the rotational number of the generator. As a result, the noise included in the rotational number signal of the generator is removed.

This embodiment has a similar effect as that of the embodiment of FIG. 13.

An angular velocity detecting unit used for a PSS will be described.

A turbine generator has a shaft type structure in which a generator rotor and inertia members of, e.g., a high-, medium-, or low-pressure turbine, are coupled by a shaft. The mechanical movement of the shaft in the rotating direction can be expressed in the form of a shaft torsion vibration model assuming that each of the inertia members is a mass point and the coupled shaft is a spring having a restoring force in the rotating direction.

When the angular velocity of the turbine generator having such a shaft type structure is to be detected, assume that the state of the gear arranged at the end of the shaft of the generator rotor is detected by an electromagnetic pickup. Then, the detected signal includes a shaft torsion vibration component of the respective inertia members. In order to obtain the angular velocity (referred to as "average angular velocity") of the turbine generator as a rigid body, the shaft torsion vibration component must be removed by some method. For this purpose, an angular velocity detecting unit 150, as shown in FIG. 16 is used in the present invention.

Figure 16:
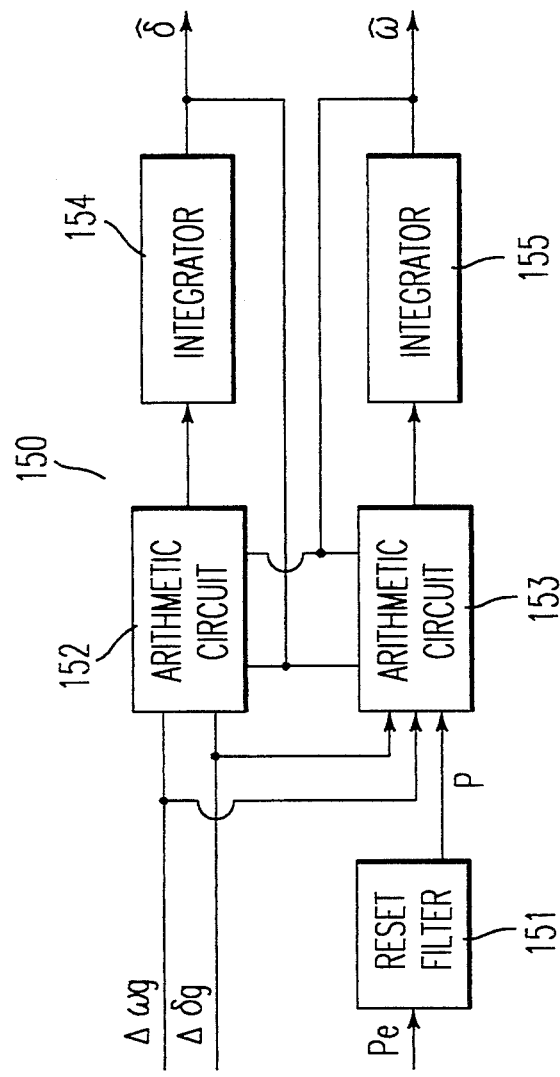
FIG. 16 is a circuit diagram of an angle detecting unit used in a power system control apparatus.

The angular velocity detecting unit 150 shown in FIG. 16 has a reset filter 151 and arithmetic circuits 152 and 153. The reset filter 151 receives a transmission active power signal ΔPe. The arithmetic circuits 152 and 153 receive a generator rotational number signal Δωg and a generator phase angle signal Δδg. The reset filter 151 is an incomplete differentiating filter having a time constant of 5 seconds, and cuts high- and low-frequency components from the active power ΔPe and passes only a signal of a frequency band concerning power stabilization. The signal ΔPe which is output from the reset filter 151 is input to the arithmetic circuit 153.

The arithmetic circuit 152 calculates a change in phase angle from the signals Δωg and Δδg in accordance with the following equation (34), and the arithmetic circuit 153 calculates a change in angular velocity from the signals Δωg, Δδg, and ΔPe in accordance with the following equation (35):

$$K_{11}\delta + K_{12}\omega + K_{13}\Delta\iota g + K_{14}\Delta\omega g \quad (34)$$

$$K_{21}\delta + K_{22}\omega + K_{23}\Delta P + K_{24}\Delta\delta g + K_{25}\Delta\omega g \quad (35)$$

Note that parameters $K_{11}$, $K_{12}$, ... are set at optimum values in accordance with the characteristics of the generator.

The output terminals of the arithmetic circuits 152 and 153 are connected to the input terminals of integrators 154 and 155, respectively. The integrator 154 integrates changes in phase angle to calculate an estimated phase angle $\hat{\delta}$. The integrator 155 integrates changes in angular velocity to calculate estimated angular velocity $\hat{\omega}$.

When the parameters $K_{11}$ to $K_{25}$ are set to appropriate values, the arithmetic circuits 152 and 153 and the integrators 154 and 155 constitute a Kalman filter. A Kalman filter efficiently removes disturbance included in an input signal. In this embodiment, the Kalman filter removes a shaft torsion vibration of the turbine shaft.

The arithmetic circuits 152 and 153 and the integrators 154 and 155 constitute a simulator that simulates power fluctuation of the generator. Therefore, the estimated angular velocity ω is output without substantially any response delay which poses a problem in a low-pass filter.

The design of the arithmetic circuits 152 and 153 will be described.

The fluctuation equation of a phase angle of a generator is expressed by the following equation (36):

$$\frac{M}{\omega 0}\ddot{\delta} + \frac{D}{\omega 0}\dot{\delta} = Tm - Pe \quad (36)$$

where
ω0: standard angular velocity (60 Hz)
D: attenuation coefficient (5 pu)
Pe: active power
M: generator inertia (6 sec.)
Tm: mechanical torque The figures in parentheses are parameters of a standard thermal generator having an output of about 500 thousand kW. Substitutions of Pe−Tm=ΔPe and the various values into equation (36) yield the following equation (37):

$$6\ddot{\delta} + 6\delta' + 377\Delta Pe = 0 \quad (37)$$

Namely, $$X = \begin{pmatrix} \delta \\ \delta' \end{pmatrix} A = \begin{pmatrix} 0 & 1 \\ 0 & -5/6 \end{pmatrix} \quad (38)$$

$$B = \begin{pmatrix} 0 \\ -377/6 \end{pmatrix} C = \begin{pmatrix} 1 & 0 \\ 0 & 1 \end{pmatrix}$$

$$\dot{X} = AX + B\Delta Pe$$

$$Y = CX$$

where x is a state vector (two-dimensional) and Y is an observation amount and is a vector consisting of a phase angle and an angular velocity. A matrix L is a Kalman gain to be set at an appropriate value:

$$\dot{X} = (A - L \cdot C)X + Bu + LY \quad (39)$$

where X is an estimated state amount.

In this embodiment, L is determined such that the eigenvalue of (A−LC) becomes as follows:

Eigenvalue=(−1.22±0.38i)

At this time, the gain becomes as follows:

$$L = \begin{pmatrix} 1.16 & 0.187 \\ 0.187 & 0.456 \end{pmatrix}$$

Figure 17:
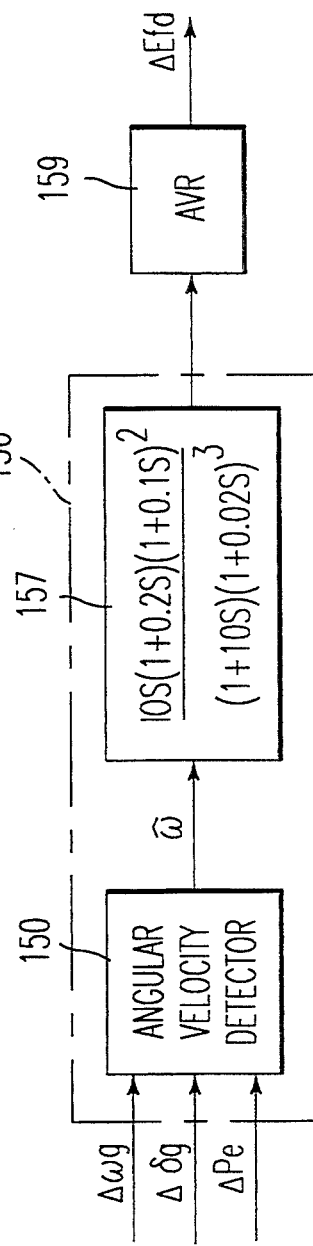
FIG. 17 is a block circuit diagram of a power stabilizer controlled by a control signal from the angle detecting unit shown in FIG. 16.

The coefficients $K_{11}, \ldots, K_{24}$ are as follows:
$K_{11}=-1.16$, $K_{12}=0.813$, $K_{13}=1.16$, $K_{14}=0.187$
$K_{21}=-0.187$, $K_{22}=-1.29$, $K_{23}=-62.8$,
$K_{24}=0.187$, $K_{25}=0.456$ FIG. 17 shows a PSS of a generator using the angular velocity detecting unit described above. This PSS 156 comprises the angular velocity detecting unit 150 described above and a power stabilizing filter 157. An angular velocity ($\omega$) output signal output from the angular velocity detecting unit 150 is filtered by the power stabilizing filter 157, and an output signal from the filter 157 is input to an AVR 159 as the output signal of the PSS 156. The excitation circuit of the generator is controlled by an output signal $\Delta Etd$ of the AVR 159.

Figure 18A:
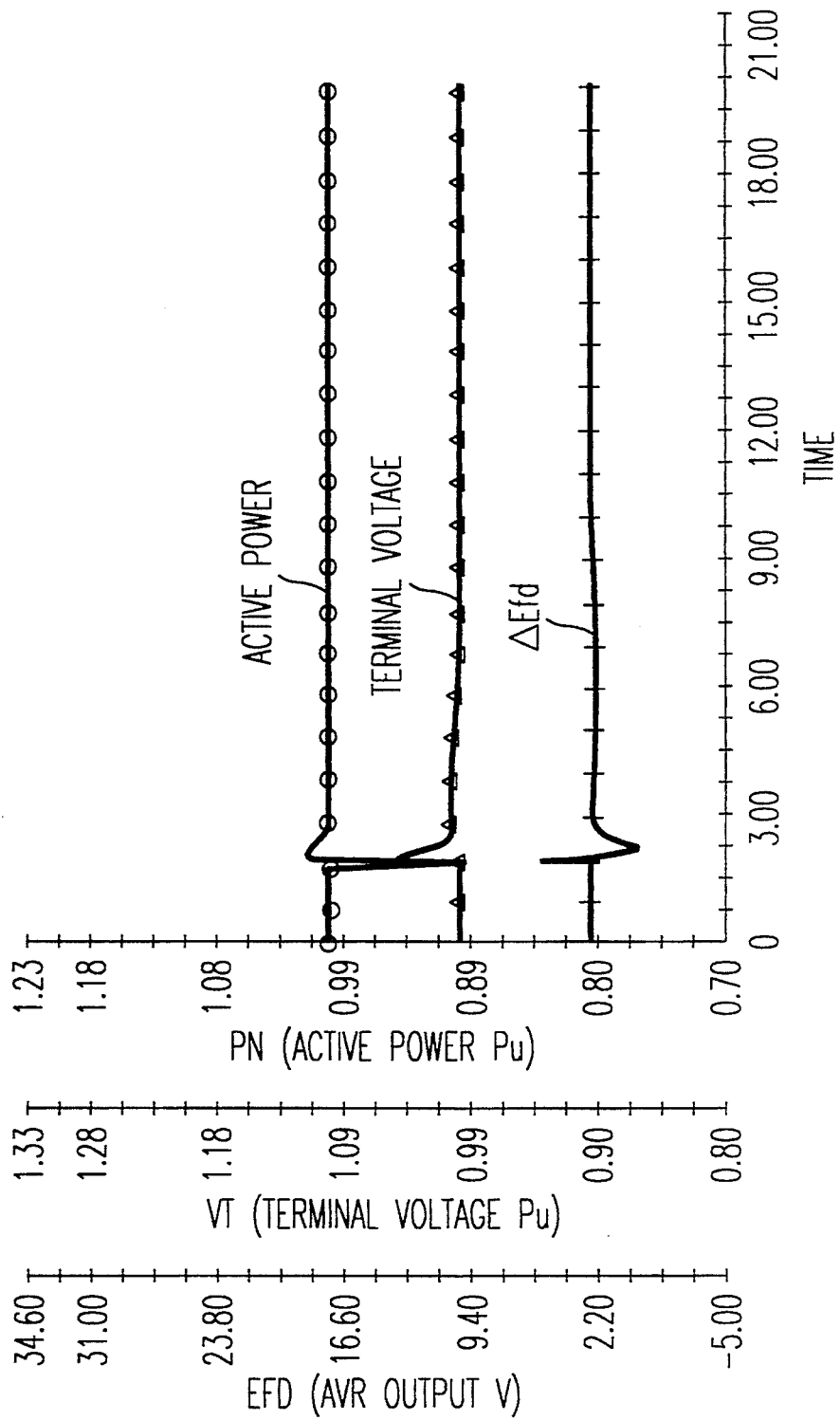
FIGS. 18A and 18B are graphs respectively showing a power stabilizing characteristic obtained by the power stabilizer of FIG. 17 and that obtained by the conventional power stabilizer.
Figure 18B:
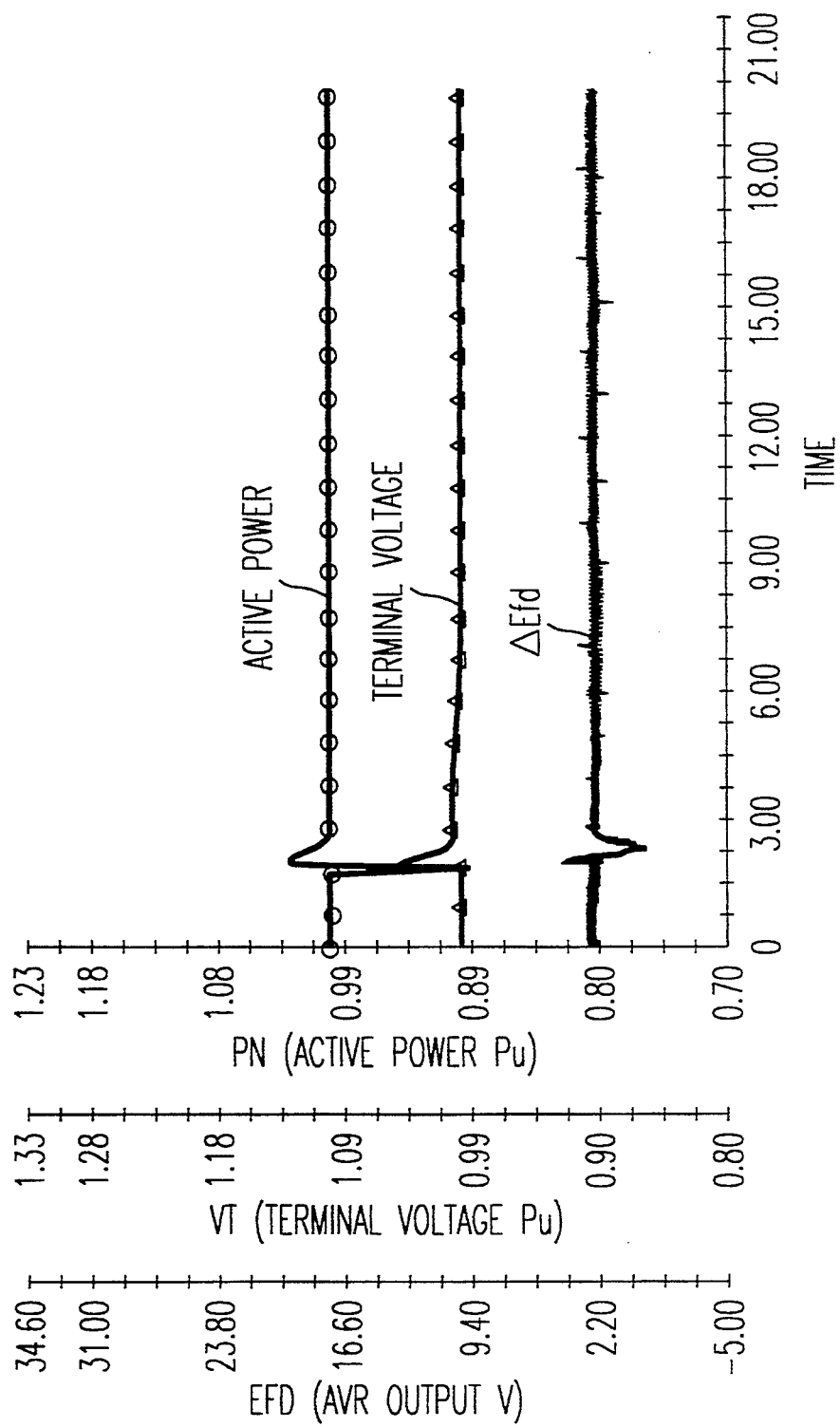

FIG. 18A shows the response of the PSS when a vibration component of 10 Hz corresponding to the shaft torsion vibration is superposed on the phase, the angular velocity, and the active power of the generator. FIG. 18B shows the response of the PSS when the noise in angular velocity is removed by a conventional delaying filter having a constant of $1/(1+0.025s)$. Note that these response characteristics are those when the power system impedance is changed from 0.2 pu to 0.3 pu in a stepwise manner.

As is apparent from FIGS. 18A and 18B, $\Delta Efd$ does not sufficiently fluctuate in the PSS of the present invention using the Kalman filter, whereas $\Delta Efd$ greatly fluctuates for 10 Hz in the conventional PSS. In this embodiment, divergence does not occur since a constant width vibration 10 Hz is applied to the generator. In practice, however, since the turbine shaft vibration is amplified by the PSS to resonate, a considerably large vibration is observed. In this embodiment, such a destructive phenomenon is prevented, and the generator turbine is safely maintained.

It is known that a Kalman filter is effective for removing white noise. It is effective also for removing a high-frequency mode, as in this invention.

As has been described above, according to the present invention, the power system impedance can be correctly estimated in a real time manner, and a braking force against a power fluctuation sufficient for a great change in power system impedance can be ensured.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A filter device for removing noise components from an angular velocity signal, comprising:
   first arithmetic means for calculating changes in phase angle from a rotational number signal and a phase angle signal;
   second arithmetic means for calculating changes in angular velocity from the rotational number signal, the phase angle signal and changes in an active power;
   a first integrator for integrating the changes in phase angle to obtain an estimated phase angle;
   a second integrator for integrating the changes in angular velocity to obtain an estimated angular velocity; and
   a power stabilizing filter for damping a power swing of a generator using the estimated angular velocity signal.

2. A filter device for removing noise components from an angular velocity signal according to claim 1, wherein said first arithmetic means calculates changes in phase angle in accordance with the following equation:

$$K_{11}\delta + K_{12}\omega + K_{13}\Delta\delta g + K_{14}\Delta\omega g$$

and said second arithmetic means calculates changes in angular velocity in accordance with the following equation:

$$K_{21}\delta + K_{22}\omega + K_{23}\Delta P + K_{24}\Delta\delta g + K_{25}\Delta\omega g$$

where $\Delta\delta g$ is a phase angle signal, $\Delta\omega g$ is a rotational number signal, $\Delta P$ is active power, $\delta$ is an estimated phase angle, $\omega$ is an estimate angular velocity, and $K_{11}, K_{12}, \ldots$ are parameters set in accordance with the characteristics of a generator.

* * * * *